US010523733B1

(12) United States Patent
Bharrat et al.

(10) Patent No.: US 10,523,733 B1
(45) Date of Patent: Dec. 31, 2019

(54) HIGHLY SCALABLE METHODS AND APPARATUS FOR BALANCING SIP LOADS ACROSS A CLUSTER OF SIP PROCESSING ENTITIES

(71) Applicant: Ribbon Communications Operating Company, Inc., Westford, MA (US)

(72) Inventors: Shaun Jaikarran Bharrat, Manalapan, NJ (US); Aby Kuriakose, Howell, NJ (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 282 days.

(21) Appl. No.: 15/168,841

(22) Filed: May 31, 2016

(51) Int. Cl.
*H04L 29/06* (2006.01)
*H04L 12/803* (2013.01)

(52) U.S. Cl.
CPC ............ *H04L 65/80* (2013.01); *H04L 47/125* (2013.01); *H04L 65/1069* (2013.01); *H04L 65/1083* (2013.01)

(58) Field of Classification Search
CPC ..... H04L 47/125; H04L 65/80; H04L 65/105; H04L 65/1006; H04L 65/1046; H04L 65/1069; H04L 65/1083; H04L 67/1002; H04L 67/1004; H04L 67/1036; H04M 7/006
See application file for complete search history.

(56) References Cited

U.S. PATENT DOCUMENTS

| | | | |
|---|---|---|---|
| 2008/0127232 A1* | 5/2008 | Langen et al. | |
| 2013/0054806 A1* | 2/2013 | Francis | H04L 67/1002 709/226 |
| 2016/0205519 A1* | 7/2016 | Patel | H04L 67/1002 455/518 |
| 2018/0323901 A1 | 11/2018 | Seok | |

* cited by examiner

*Primary Examiner* — Marsha D Banks Harold
*Assistant Examiner* — Dharmesh J Patel
(74) *Attorney, Agent, or Firm* — Straub & Straub; Stephen T. Straub; Michael P. Straub

(57) ABSTRACT

Methods, apparatus and systems for load balancing Session Initiation Protocol session transactions among a self-organized cluster of SIP processing devices. An exemplary method embodiment includes the steps of dynamically forming a load balancing cluster of SIP processing devices from a plurality of SIP processing devices, said cluster of SIP processing devices being self-organized; dynamically building a communications network, by said cluster of SIP processing devices, for distributing session transaction load state information among the SIP processing devices in the cluster; and each of the SIP processing devices of the cluster asynchronously determining session transaction load state information on a recurring basis reflecting its current session transaction load state. In some embodiments, the SIP processing devices are session border controllers.

20 Claims, 18 Drawing Sheets

| FIGURE 8A |
| FIGURE 8B |

| FIGURE 9A |
|---|
| FIGURE 9B |

HIGHLY SCALABLE METHODS AND APPARATUS FOR BALANCING SIP LOADS ACROSS A CLUSTER OF SIP PROCESSING ENTITIES

FIELD

The present application relates to highly scalable methods and apparatus for balancing Session Initiation Protocol (SIP) loads across a cluster of SIP processing entities/devices, e.g., Session Border Controllers, in a standards compliant environment.

BACKGROUND

SIP processing devices such as for example Session Border Controllers (SBCs) provide various features and services such as for example security, interoperability, routing and other functions in a Session Initiation Protocol (SIP) network. A service provider may use an SBC to support thousands of sessions and broad signaling interworking (to support more peer connections with international carriers); an enterprise may need an SBC to manage dial plans and policies across multiple PBX systems.

One of the most important Session Border Controller services/features is the ability to support high capacity requirements for real-time, multimedia SIP traffic, e.g., Voice Over Internet Protocol (VOIP) call session traffic within a SBC system that is highly scalable. To achieve such features, a cluster of SBCs operating together is often utilized. Load balancing of the SIP processing activities (e.g., registrations, calls, etc.) across the SBC instances is necessary to achieve such services.

However, there are numerous issues when balancing SIP load across a cluster of SIP processing entities, such as SBCs. Simplistic load balancing schemes (such as multiple routes in the peers) are not practical in many such instances. This is the case, for example, when attempting to balance SIP loads across a cluster of Session Borders Controllers (SBCs), especially when the load balancing solution needs to be highly scalable supporting potentially many hundreds or thousands of SBC entities. There is also a need for load balancing schemes that are completely standards based, requiring no proprietary behavior on the part of any peers and/or intermediaries so that the SBCs can interoperate with other vendors' equipment. Furthermore, there is a need for SIP load balancing solutions that cover multiple application spaces including peering, access, encrypted transports, and Network Address and Port Translation (NAPT) scenarios.

Additionally many environments employ initial load balancing schemes that are not coupled, or are only loosely coupled, to the actual loading of SBCs in the cluster. In many instances, this initial load balancing results in uneven distribution of load within the SBC cluster because the cost for different call flows is disparate. Consequently, SBC load balancing performed within a cluster needs to able to work with the different initial load balancing schemes that may result in poor load balancing by the peers.

As part of scalability, the SIP load balancing needs to be able to work with the dynamic addition of SBCs to the cluster.

The aforementioned problems and needs become amplified when SBC services are implemented as a collection of virtualized SBC instances within a cloud environment where many software instances are needed to match the capabilities of current hardware based SBCs.

It should be appreciated that there is a need for methods and apparatus that can provide SIP load balancing across a cluster of SIP processing entities/devices, e.g., SBCs.

It should further be appreciated that there is a need for methods and apparatus that can provide SIP load balancing across a cluster of SIP processing devices, e.g., SBCs, that provide a highly scalable solution with high performance.

It should be further appreciated that there is a need for methods and apparatus that provide SIP load balancing across a cluster of SIP processing devices, e.g., SBCs, in a completely standards based environment in which no proprietary behavior is required on the part of any peers and/or intermediaries that interact with the SIP processing devices, e.g., SBCs, of the cluster.

It should be further appreciated that there is a need for methods and apparatus that provide SIP load balancing across a cluster of SIP processing devices, e.g., SBCs, that achieves good load balancing across a variety of situations including disproportionate load across different call flows, dynamic addition of nodes, e.g., SBCs, to a cluster, bad distribution of load by peers or first stage load balancing, and other conditions which cause hot-potting within a cluster.

It should be further appreciated that there is a need for methods and apparatus that provide SIP load balancing across a cluster of SIP processing devices, e.g., SBCs, that is highly scalable and whose performance does not appreciably degrade as the number of nodes (SBCs) in the cluster increases.

It should also be appreciated that there is a need for methods and apparatus that provide SIP load balancing across a cluster of SIP processing devices, e.g., SBCs, that provide support for and work with a wide range of application including peering, access, encrypted transports, and NAPT usage.

SUMMARY

Various embodiments, in accordance with the present invention, are directed to methods and apparatus for providing SIP load balancing across a cluster of SIP entities/devices, e.g., SBCs, and address the problems and needs discussed above.

Various embodiments solve communications centric technical problems relating to congestion and load balancing of SIP transactions by providing methods, apparatus and systems that achieve more efficient resource utilization and higher throughput.

For example, one embodiment of the method of the present invention includes the steps of dynamically forming a load balancing cluster of session border controllers from a plurality of session border controllers, said cluster of session border controllers being self-organized; dynamically building a communications network, by said cluster of session border controllers, for distributing session transaction load state information among the session border controllers in the cluster; each of the session border controllers of the cluster asynchronously determining session transaction load state information on a recurring basis reflecting its current session transaction load state. In some embodiments, the method further includes each of the session border controllers of the cluster asynchronously sharing on a recurring basis its generated session transaction load state information with the other session border controllers of the cluster.

In some embodiments, the method further includes performing a first level load balancing of session transactions among said cluster of session border controllers. In some embodiments, the first level load balancing of session transaction is performed by a front end load balancing device. In some, but not all embodiments, the first level of load balancing is performed without knowledge of the session transaction load state information for the session border controllers of the cluster.

In some embodiments, the method further includes performing, by the SBCs of the cluster, a second level of load balancing of said session transactions using said shared session transaction load state information, said second level of load balancing including each of the session border controllers upon receipt of a session transaction initiation request probabilistically retargeting said session transaction initiation request based on knowledge of the load of the peer session border controllers of the cluster determined from said shared session transaction load state information. In some embodiments, the slack capacity shared by an SBC is a minimum of the count-based slack capacity and the rate based slack capacity.

In some embodiments, the method further includes a set of individual SIP processing devices of the cluster of SIP processing devices asynchronously sharing on a recurring basis generated session transaction load state information with one or more SIP processing devices of the cluster. In some such embodiments, the set of individual SIP processing devices of the cluster includes less than all of said SIP processing devices in said cluster.

In some embodiments, the method further includes performing, by the SIP processing devices of the cluster, a second level load balancing of said session transactions using said shared session transaction load state information, said second level load balancing including individual SIP processing devices upon receipt of a session transaction initiation request probabilistically retargeting said session transaction initiation request based on knowledge of the load of peer SIP processing devices of the cluster determined from said shared session transaction load state information.

In some embodiments of the method, the session transaction load state information for a SIP processing device corresponds to at least one of a slack capacity of the SIP processing device or a portion of the SIP processing resources being utilized of the total SIP processing resources available for utilization of the SIP processing device.

In some embodiments of the method, the session transaction load state information for a SIP processing device corresponds to said slack capacity, said slack capacity including at least one of a call capacity or a session registration capacity.

In some embodiments of the method, the slack capacity is determined based on two dimensions, the first dimension being a count-based slack capacity and the second dimension being a rate based slack capacity.

An exemplary communications system for load balancing Session Initiation Protocol session transactions among a self-organized cluster of Session Initiation Protocol (SIP) processing devices in accordance with the present invention includes:

a plurality of self-organizing SIP processing devices configured to dynamically form a load balancing cluster of SIP processing devices; a communications network coupling the SIP processing devices of the cluster together for distributing session transaction load state information among the SIP processing devices in the cluster, and wherein each of the SIP processing devices of the cluster includes a processor configured to independently and asynchronously control the SIP processing device in which the processor is included to generate session transaction load state information on a recurring basis reflecting its current session transaction load state.

In some of such systems, the SIP processing devices are SBCs, SIP proxy devices or SIP application servers.

In some communications system embodiments, a set of individual SIP processing devices of the cluster of SIP processing devices have their corresponding processor further configured to control the SIP processing device in which the processor is included to share on a recurring basis said generated session transaction load state information with one or more SIP processing devices of the cluster.

In some communications systems embodiments, the system further includes a front end loading balancing device including a processor configured to control the front end load balancing device to perform a first level load balancing of session transactions among said cluster of SIP processing devices.

In some communications systems embodiments, each of the SIP processing devices of the cluster of SIP processing devices includes a receiver for receiving session transaction initiation requests; and the processors included in each of the SIP processing devices of the cluster are configured to control the SIP processing devices of the cluster in which the processor is included to perform a second level load balancing of said session transactions using said shared session transaction load state information upon receipt of a session transaction initiation request, said second level load balancing including probabilistically retargeting said session transaction initiation request based on knowledge of the load of peer SIP processing devices of the cluster determined from said shared session transaction load state information.

While various exemplary embodiments and features have been described, numerous additional features and embodiments are described in the detailed description which follows. Furthermore it should be understood that while various features and elements are described in this summary all features and elements are not necessary or required for all embodiments of the invention.

DETAILED DESCRIPTION

The details of various methods and apparatus embodiments for providing SIP load balancing across a cluster of SIP processing entities in accordance with the present invention will now be discussed.

Figure 1:
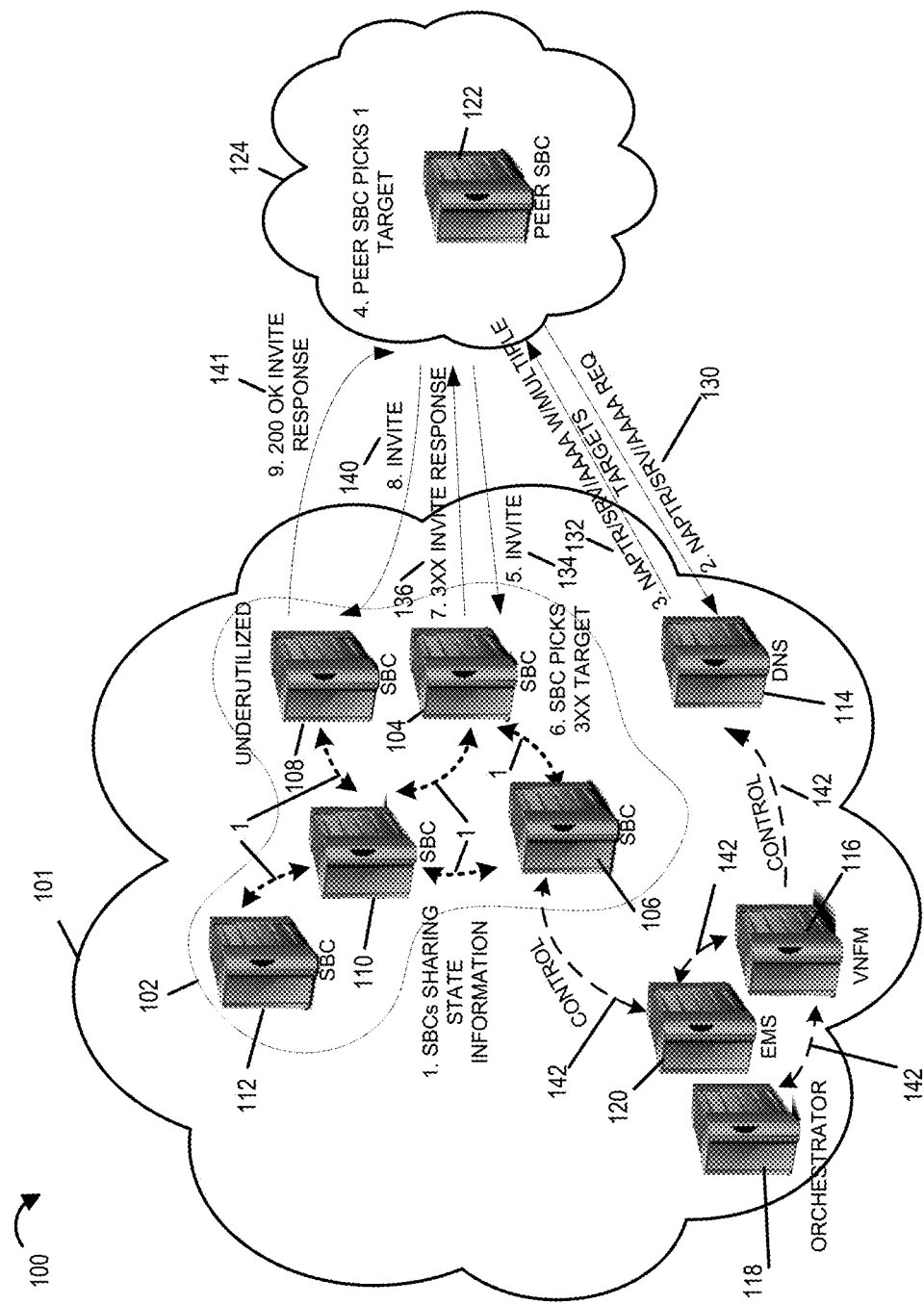
FIG. 1 illustrates an exemplary system and method steps in accordance with an exemplary embodiment of the present invention which uses 3XX messaging to achieve retargeting.

System 100 of FIG. 1 is an exemplary communications system for providing SIP transaction load balancing across a cluster of SIP processing entities 102 within a network 101 which may be, and in some embodiments is, an Internet cloud computer network. The exemplary SIP processing entities included in the cluster 102 are the Session Border Controllers (SBCs) 104, 106, 108, 110 and 112. These SBCs are coupled together via a set of communications links forming a partial or full mesh network. The communications links allow for the sharing of each SBC's state information with the other SBCs of the cluster, e.g., resource utilization, session transaction state information, etc. In some embodiments, one or more of the SBCs of the cluster 102 are implemented in accordance with description of the SBC 300 of FIG. 3 discussed below.

The system 100 also includes in some embodiments one or more of the following a Domain Name System (DNS) server 114, an Orchestrator device 118, a Virtual Network Function Manager (VNFM) device 116 and an Element Management System 120. Communications links which are not shown couple these devices together and also couple the devices to the SBCs of the cluster of SBCs 102. The DNS server 114 stores domain names and translates them into IP addresses. In some embodiments, the Orchestrator device 118, Virtual Network Function Manager device 116 and Element Management System 120 are operated to configure and manage the various devices in the network 101 including the SBCs of the cluster 102 by sending control signals 142 to the various devices of the network. In some embodiments, a network controller, not shown, is coupled to the various devices in the network including the SBCs of the cluster. The network controller is operated to configure and manage the various devices in the network 101 including the SIP processing devices of the cluster. In such embodiments, the Orchestrator device 118, Virtual Network Function Manager device 116 and the Element Management System 120 are typically not included in the system. The Orchestrator device 118, Virtual Network Function Manager device 116, and the Element Management System 120 are not involved in the either the first or second level load balancing operations as will be understood from the discussion. The second level load balancing of SIP transactions across the cluster of SBCs is performed by the SBCs of the cluster of SBCs.

The DNS system is also coupled via a communication link to a peer SBC 122 which is not part of the cluster of SBCs 102. The SBC 122 may be, and in some embodiments is, implemented in accordance with the SBC 300 of FIG. 3 which is described in detail below.

In this example the SBC 122 is part of a separate communications network 124 and is coupled to the DNS system 114 and the various SBCs 104, 106, 108, 110, and 112 of the cluster of SBCs 102.

Elements in other figures with the same reference numbers are used to refer to the same or similar elements and thus will not be described in detail again.

Steps 1 through 9 shown in FIG. 1 illustrate the steps of an exemplary SIP transaction load balancing method in accordance with one embodiment of the present invention. In this exemplary method the redistribution of SIP transactions within the SBC cluster is achieved using SIP 3xx messages for retargeting.

Figure 2:
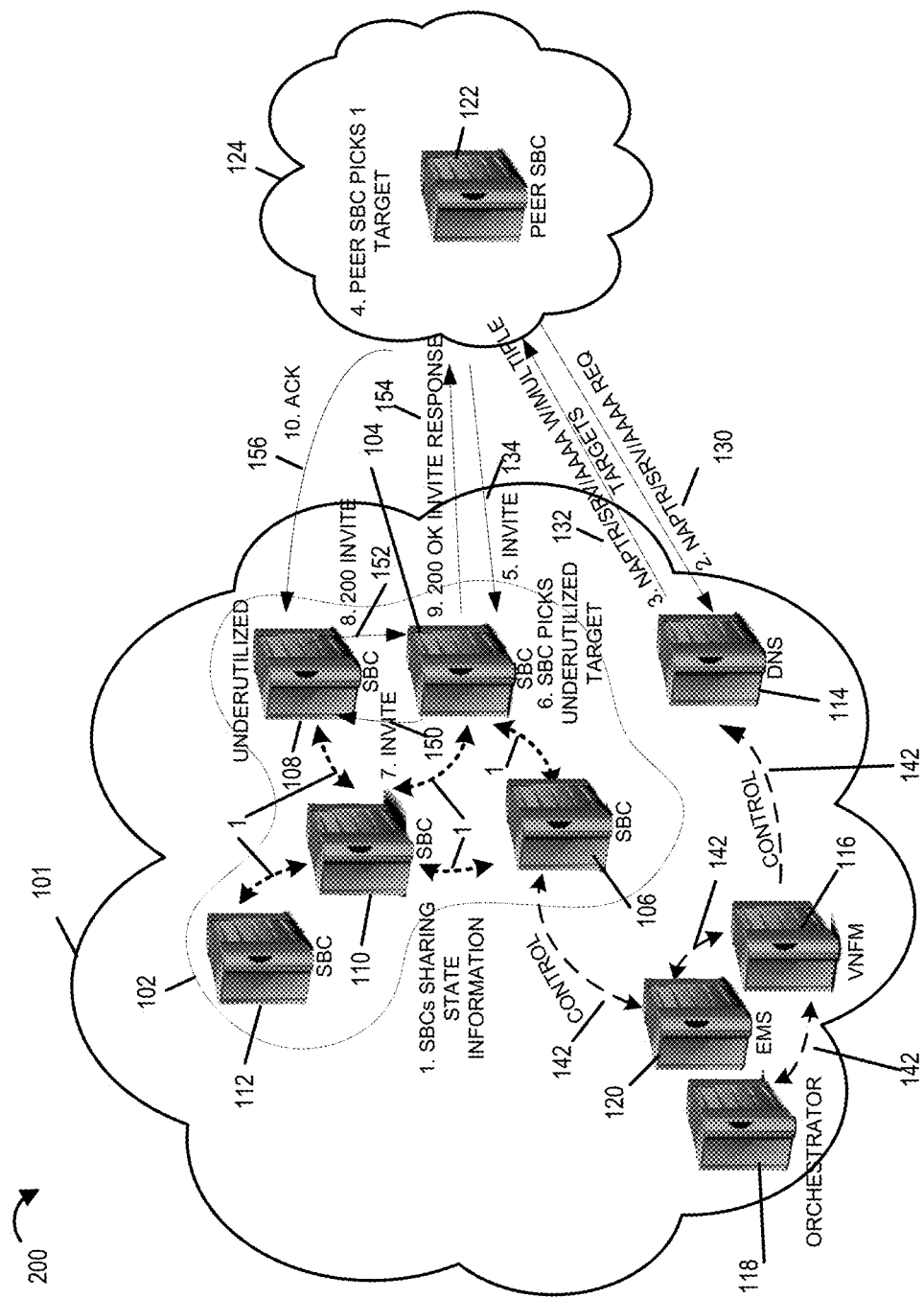
FIG. 2 illustrates an exemplary system and method steps in accordance with an exemplary embodiment of the present invention in which retargeting is achieved by proxying or relaying received requests to new selected targets.

Steps 1 through 10 shown in FIG. 2 illustrate the steps of an exemplary SIP transaction load balancing method in accordance with another exemplary embodiment of the present invention. In this exemplary method the redistribution of SIP transaction within the SBC cluster is achieved using internal retargeting of SIP Invite message within the cluster which will be explained in further detail below.

Figure 3:
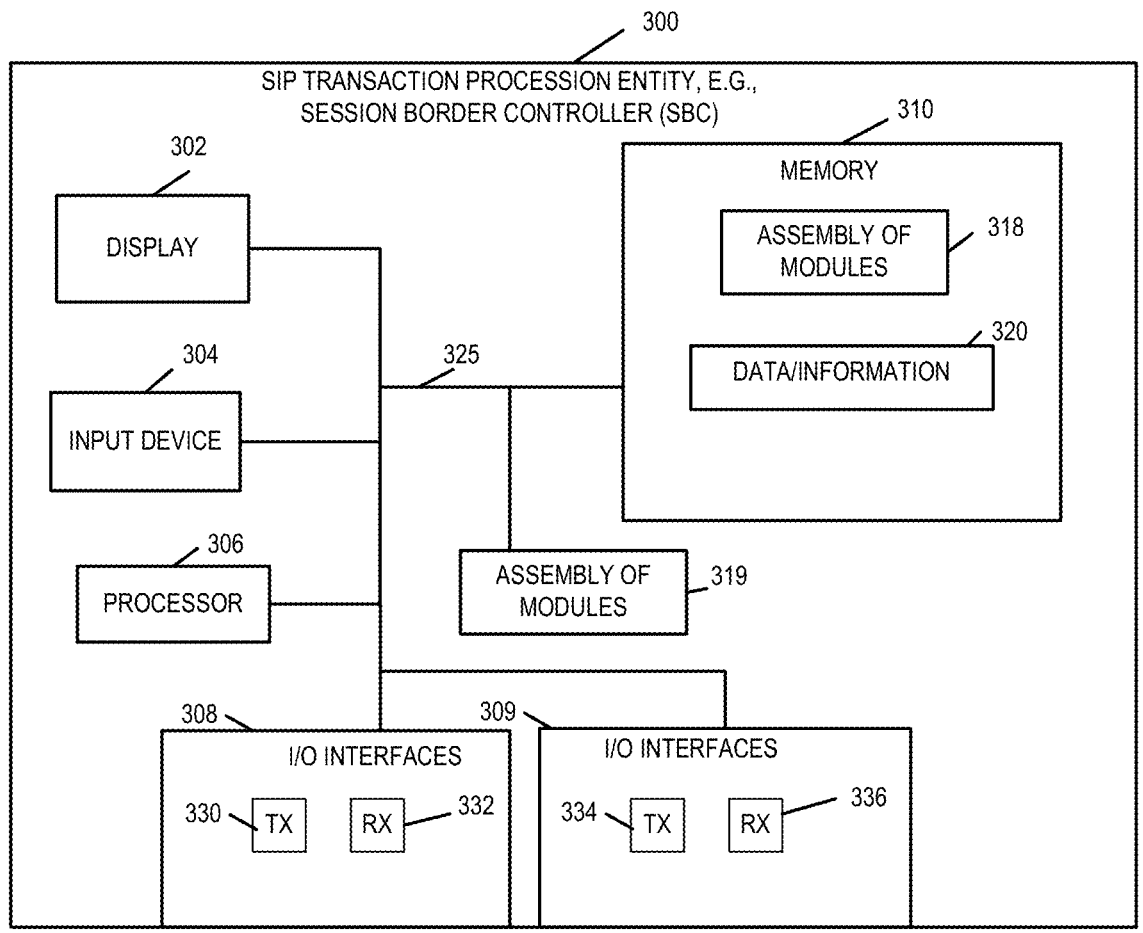
FIG. 3 illustrates an exemplary SIP processing entity in accordance with one embodiment of the present invention.

FIG. 3 illustrates an exemplary SIP transaction processing entity, e.g., a Session Border Controller (SBC) in accordance with an embodiment of the present invention. Exemplary SBC device 300 includes a display 302, an input device 304, a processor 306, e.g., a CPU, I/O interfaces 308 and 309, which couple the SBC device to networks e.g., network 124 and/or various other devices including other SBCs, EMS, Orchestrator, VNFM devices, and user equipment devices, memory 310, and an assembly of modules 319, e.g., circuits corresponding to different modules, coupled together via a bus 325 over which the various elements may interchange data and information. Memory 310 includes an assembly of modules 318, e.g., an assembly of software modules, and data/information 320. The I/O interface 308 includes transmitters 330 and receivers 332. The I/O interface 309 includes transmitters 334 and receivers 336. The SIP processing device is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), User Datagram Protocol (UDP), Session Initiation Protocol (SIP) and Session Description Protocol (SDP). In some embodiments, the SIP processing device 300 includes a communication module configured to operate using IP, TCP, UDP and SIP protocol signaling methods. In some embodiments, the communication module is a hardware module, a software module or a module including hardware and software components.

Figure 4:
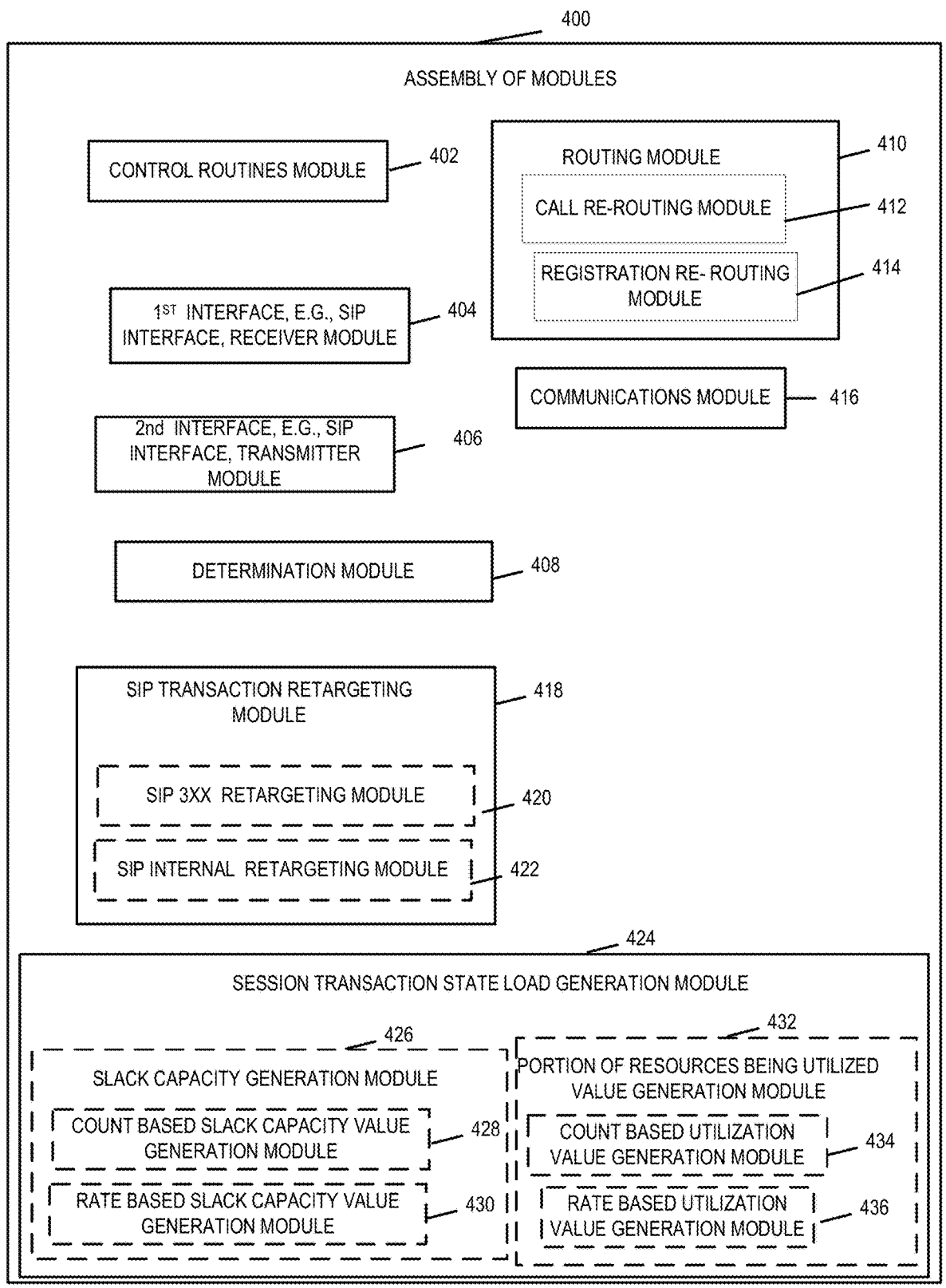
FIG. 4 illustrates an exemplary assembly of modules for a SIP processing entity such as an SBC in accordance with an embodiment of the present invention.

FIG. 4 is a drawing of assembly of modules 400 which may be, and in some embodiments is, included in exemplary SBC 300 illustrated in FIG. 3. The modules in the assembly of modules 400 may, and in some embodiments are, implemented fully in hardware within the processor 306, e.g., as individual circuits. The modules in the assembly of modules 400 may, and in some embodiments are, implemented fully in hardware within the assembly of modules 319, e.g., as individual circuits corresponding to the different modules. In other embodiments some of the modules are implemented, e.g., as circuits, within the processor 306 with other modules being implemented, e.g., as circuits within assembly of modules 319 and/or within I/O interfaces 308 and 309, external to and coupled to the processor 306. As should be appreciated the level of integration of modules on the processor and/or with some modules being external to the processor may be one of design choice.

Alternatively, rather than being implemented as circuits, all or some of the modules included in assembly of modules 400 may be implemented in software and stored in the memory 310 of the SBC 300, with the modules controlling operation of SBC 300 to implement the functions corresponding to the modules when the modules are executed by a processor, e.g., processor 306. In some such embodiments, the assembly of modules 400 is included in the memory 310 as assembly of modules 318. In still other embodiments, various modules in assembly of modules 400 are implemented as a combination of hardware and software, e.g., with another circuit external to the processor providing input to the processor 306 which then under software control operates to perform a portion of a module's function. While shown in the FIG. 3 embodiment as a single processor, e.g., computer, it should be appreciated that the processor 306 may be implemented as one or more processors, e.g., computers.

When implemented in software the modules include code, which when executed by the processor 306, configure the processor 306 to implement the function corresponding to the module. In embodiments where the assembly of modules 400 is stored in the memory 310, the memory 310 is a computer program product comprising a computer readable medium comprising code, e.g., individual code for each module, for causing at least one computer, e.g., processor 306, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 4 control and/or configure the SBC 300 or elements therein such as the processor 306, to perform functions of corresponding steps illustrated in the method flowchart 700 of FIG. 7 and in the steps of the load balancing method shown in FIGS. 1 and 2. Thus the assembly of modules 400 includes various modules that perform functions of corresponding steps of the methods shown in FIGS. 1, 2, and 7.

Assembly of modules 400 includes a control routines module 402, a first interface receiver module 404, a second interface transmitter module 406, a determination module 408, a routing module 410, a communications module 416 and a SIP transaction retargeting module 418. The routing module 410 includes optional call re-routing sub-module 412 and registration re-routing module 414. The SIP transaction retargeting module 418 includes optional SIP 3XX retargeting module 420 and SIP internal retargeting module 422, and a session transaction state load generation module 424. The session transaction state load generation module in some embodiments includes one or more of the following modules: a slack capacity generation module 426 and a portion of resources being utilized value generation sub-module 432. In some embodiments the slack capacity generation module includes a count based slack capacity value generation module 428 and a rate based slack capacity value generation module 430. In some embodiments, the portion of resources being utilized value generation module includes one or more of the following modules: a count based utilization value generation module 434 and a rate based utilization value generation module 436.

Figure 5:
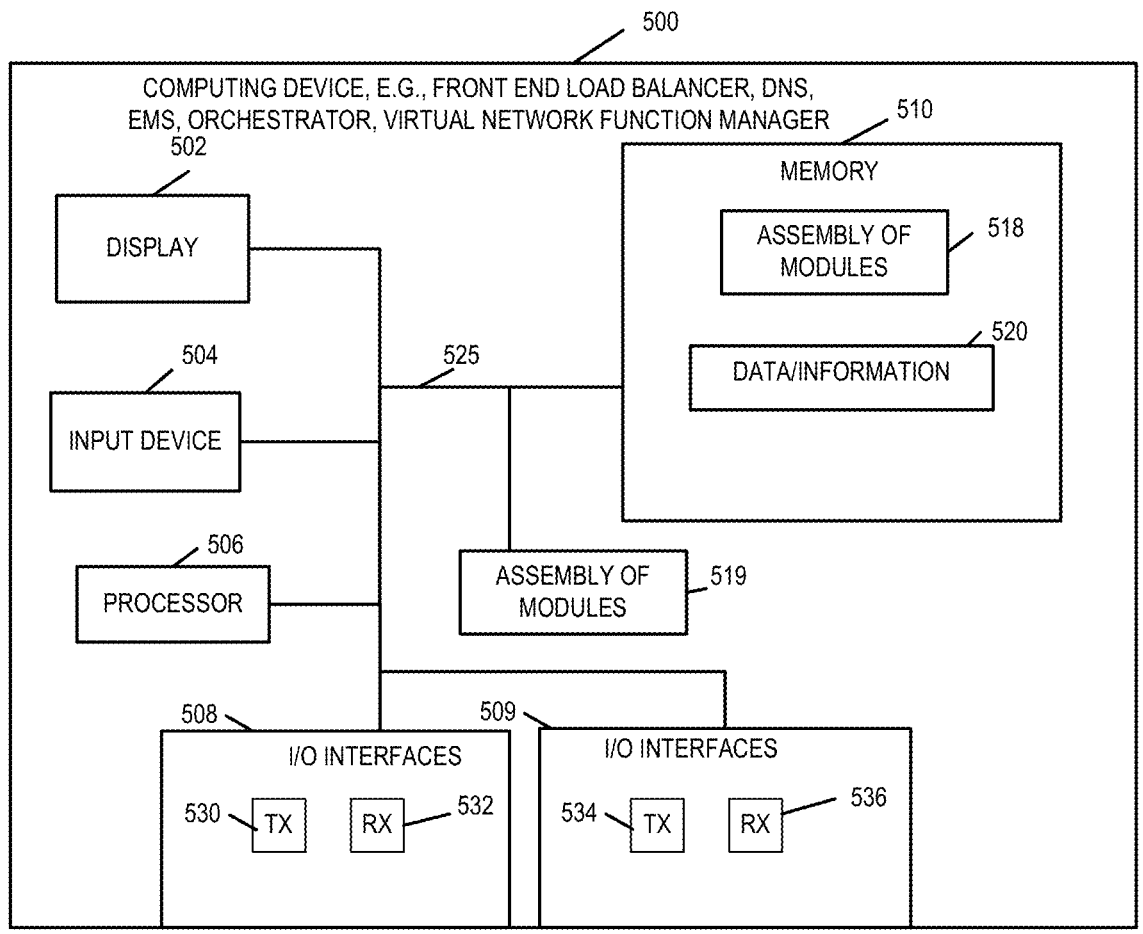
FIG. 5 illustrates an exemplary computing device that may be, and in some embodiments is, used to implement a controller, a front end load balancer, a DNS, an Orchestrator, a Virtual Network Function Manager, and/or an EMS device in accordance with an embodiment of the present invention.

FIG. 5 is an exemplary computing device 500 in accordance with an embodiment of the present invention. Exemplary computing device 500 includes a display 502, an input device 504, a processor 506, e.g., a CPU, I/O interfaces 508 and 509, which couple the computing device to networks e.g., networks 101 and 124, and/or various other devices such as for example SBCs, network controller, EMS, Orchestrator, VNFM and DNS devices and/or user equipment devices, memory 510, and an assembly of modules 519, e.g., circuits corresponding to different modules, coupled together via a bus 525 over which the various elements may interchange data and information. Memory 510 includes an assembly of modules 518, e.g., an assembly of software modules, and data/information 520. The I/O interface 508 includes transmitters 530 and receivers 532. The I/O interface 509 includes transmitters 534 and receivers 536. The computing device in some embodiments is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), User Datagram Protocol (UDP), Session Initiation Protocol (SIP) and Session Description Protocol (SDP). In some embodiments, the computing device 500 includes a communication module configured to operate using IP, TCP, UDP and SIP protocol signaling methods. In some embodiments, the communication module is a hardware module, a software module or a module including hardware and software components. In some embodiments, the I/O interfaces and communication module are configured to communicate control signals to session border controllers of a cluster. The DNS 114, EMS 120, Orchestrator 118, and Virtual Network Function Manager 116 may be, and in some embodiments are, implemented in accordance with the description of the computing device 500. In some embodiments of the invention which use a front end load balancer to perform a first level of loading balancing on the session transactions, the front end load balancer is implemented in accordance with the description of computing device 500. In some embodiments of the invention which include a network controller, the network controller is implemented in accordance with the description of computing device 500.

Figure 6:
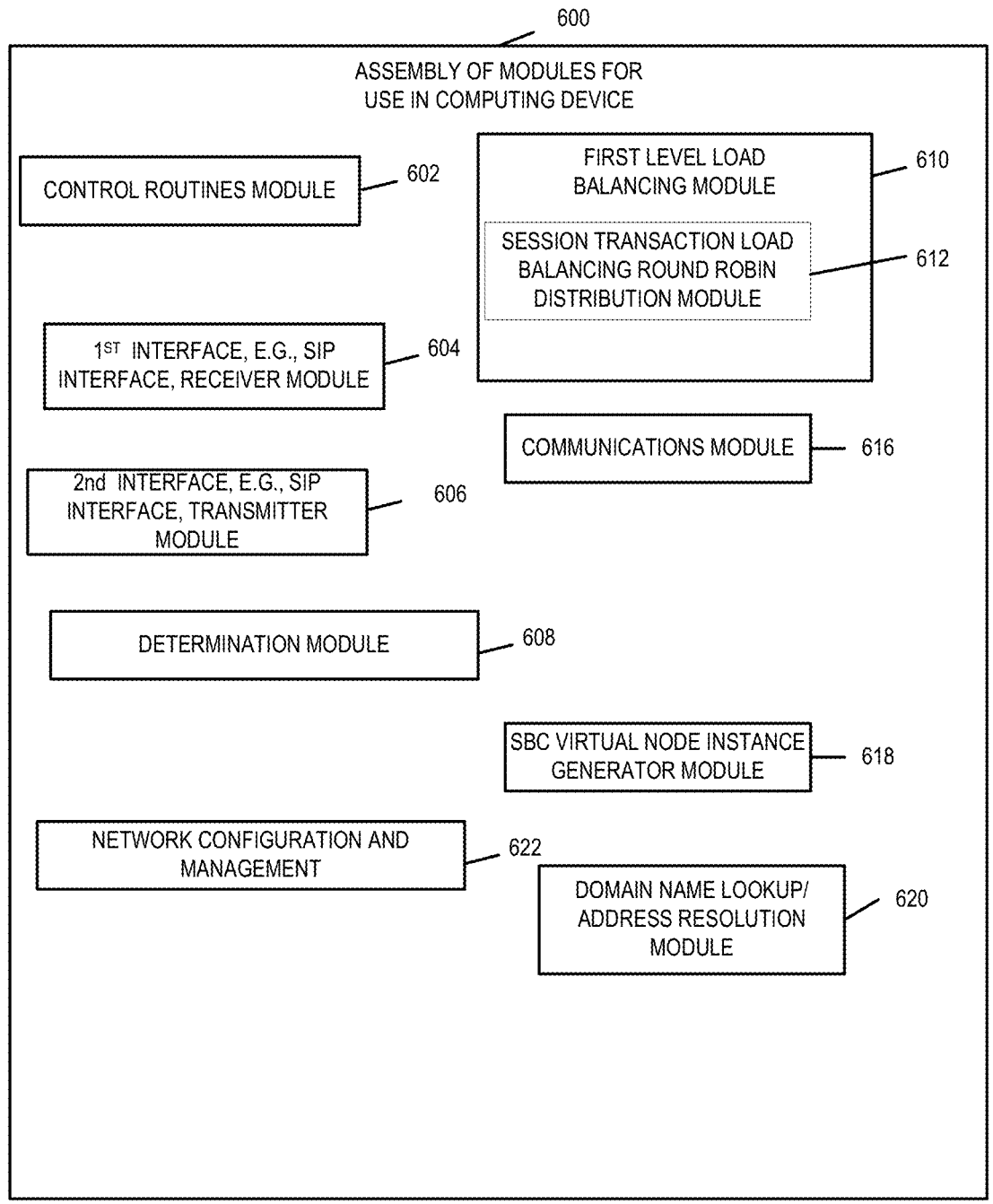
FIG. 6 illustrates an exemplary assembly of modules in accordance with an embodiment of the present invention.

FIG. 6 is a drawing of assembly of modules 600 which may be, and in some embodiments is, included in the computing device 500 when the computing device 500 is implemented as one of a front end load balancer, DNS, EMS, Orchestrator and/or Virtual Network Function Manager.

The modules in the assembly of modules 600 may, and in some embodiments are, implemented fully in hardware within the processor 506, e.g., as individual circuits. The modules in the assembly of modules 600 may, and in some embodiments are, implemented fully in hardware within the assembly of modules 519, e.g., as individual circuits corresponding to the different modules. In other embodiments some of the modules are implemented, e.g., as circuits, within the processor 506 with other modules being implemented, e.g., as circuits within assembly of modules 519 and/or within I/O interfaces 508 and 509, external to and coupled to the processor 506. As should be appreciated the level of integration of modules on the processor and/or with some modules being external to the processor may be one of design choice.

Alternatively, rather than being implemented as circuits, all or some of the modules included in assembly of modules 600 may be implemented in software and stored in the memory 510 of the computing device 500, with the modules controlling operation of computing device 500 to implement the functions corresponding to the modules when the modules are executed by a processor, e.g., processor 506. In some such embodiments, the assembly of modules 600 is included in the memory 510 as assembly of modules 518. In still other embodiments, various modules in assembly of modules 600 are implemented as a combination of hardware and software, e.g., with another circuit external to the processor providing input to the processor 506 which then under software control operates to perform a portion of a module's function. While shown in the FIG. 5 embodiment as a single processor, e.g., computer, it should be appreciated that the processor 306 may be implemented as one or more processors, e.g., computers.

When implemented in software the modules include code, which when executed by the processor 506, configure the processor 506 to implement the function corresponding to the module. In embodiments where the assembly of modules 400 is stored in the memory 510, the memory 510 is a computer program product comprising a computer readable medium comprising code, e.g., individual code for each module, for causing at least one computer, e.g., processor 506, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 6 control and/or configure the computing device 500 or elements therein such as the processor 506, to perform functions of corresponding steps illustrated in the method flowchart 700 of FIG. 7 and in the steps of the load balancing method shown in FIGS. 1 and 2. Thus the assembly of modules 600 includes various modules that perform functions of corresponding steps of the methods shown in FIGS. 1, 2, and 7.

Assembly of modules 600 includes a control routines module 602, a first interface receiver module 604, a second interface transmitter module 606, a determination module 608, a first level load balancing module 610, a communications module 616, a SBC virtual node instance generator module 618, a domain name lookup/resolution module 620, a network configuration and management module 622. The first level load balancing module 610 includes optional session transaction load balancing round robin distribution module 612.

Figure 14:
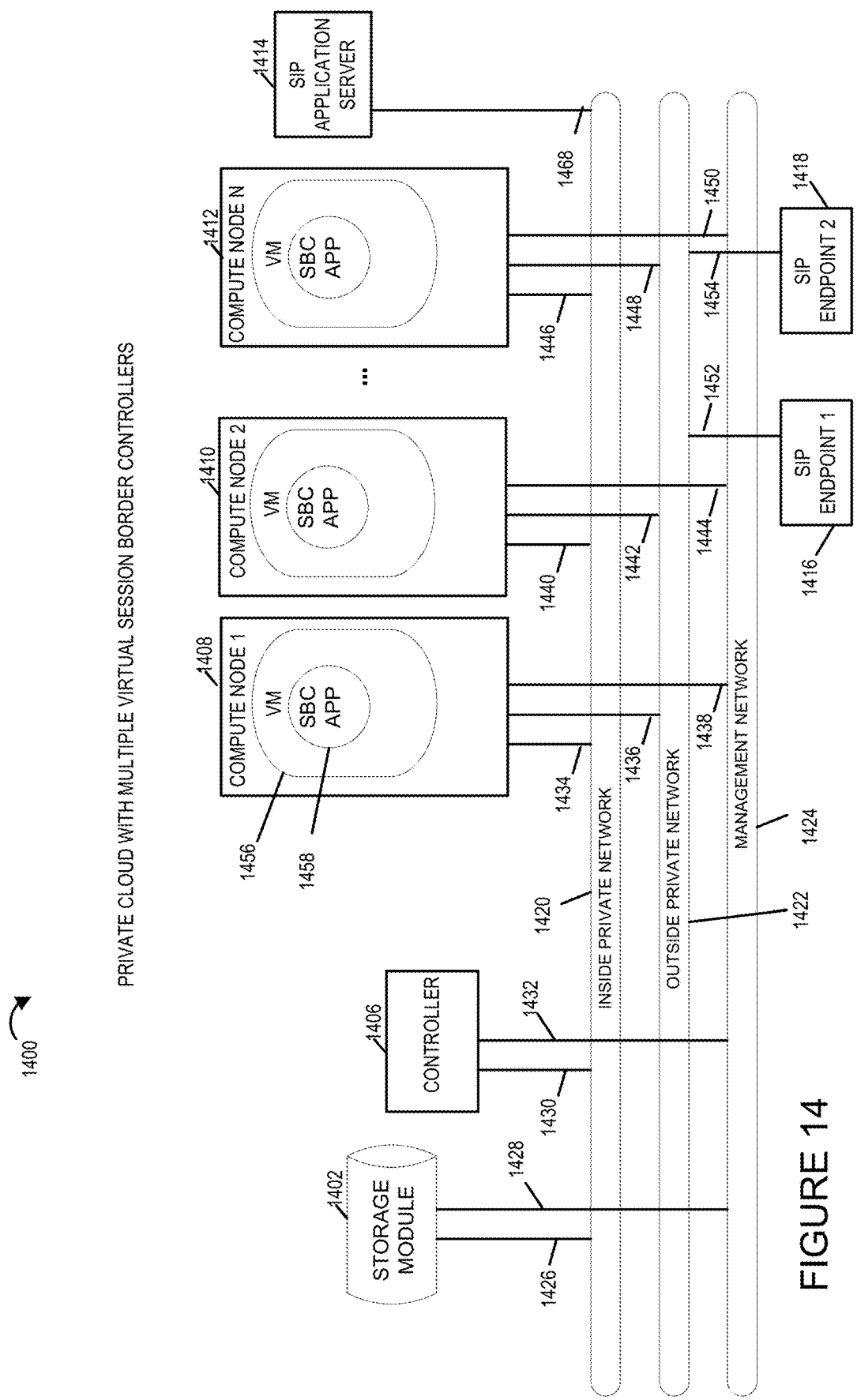
FIG. 14 illustrates a private cloud with multiple virtual session border controllers in accordance with an embodiment of the present invention.

FIG. 14 illustrates an exemplary private cloud system 1400 with multiple virtual session border controllers in accordance with an embodiment of the present invention. The system includes physical hardware resources including computing, storage, and network that provide processing, storage and connectivity which will be described in further detail below. The computing hardware includes one or more processors and commercial off the shelf (COTS) hardware that is commonly pooled. In some embodiments, the computing hardware is specialized and configured for use as session border controllers.

The system includes a storage module 1402, a controller 1406, a plurality of compute nodes, a SIP application server 1414, a SIP endpoint device 1 1416, a SIP endpoint device 2 1418, a inside private communications network 1420, an outside private communications network 1422, a management network 1424, and a plurality of communications links 1426, 1428, 1430, 1432, 1434, 1436, 1438, 1440, 1442, 1444, 1446, 1448, 1450, 1452, 1454, and 1468. The inside private communications network 1420, the outside private communications network 1422, the management network 1424, and the plurality of communications links 1426, 1428, 1430, 1432, 1434, 1436, 1438, 1440, 1442, 1444, 1446, 1448, 1450, 1452, 1454, and 1468 are used to exchange messages, information and instructions between the various devices, endpoints, nodes and entities in the system.

The plurality of compute nodes includes a compute node 1 1408, a compute node 2 1410, . . . , a compute node N 1412 where N is a positive number. The compute node 1 includes a virtual machine 1456 and a session border controller (SBC) application 1458. A compute node running a session border controller application, e.g., SBC APP 1458, is a virtualized session border controller. Each of the compute nodes 2 1410, . . . , N 1412 include a virtual machine and a SBC application. The plurality of compute nodes 1 . . . N executing software instructions to operate as a session border controller form a cluster of N SIP processing devices. When N=5, it forms a cluster of five virtual session border controllers similar to the five session border controllers of FIGS. 1 and 2. The resources, e.g., SIP processing capabilities, available to each of the virtual session border controllers may be, and typically is, different, for example based on how the virtual SBC is configured. The compute node 1 1408 is coupled to: the inside private network 1420 via communication link 1434, the outside private network 1422 via communications link 1436, and the management network 1424 via communications link 1438. The communications node 2 1410 is coupled to: the inside private network 1420 via communication link 1440, the outside private network 1422 via communications link 1442, and the management network 1424 via communications link 1444. The communications node N 1412 is coupled to: the inside private network 1420 via communication link 1446, the outside private network 1422 via communications link 1448, and the management network 1424 via communications link 1450.

The storage module 1402 is a storage device, e.g., memory, for storing instructions, information and data. The storage module 1402 is coupled to the inside private network 1420 via communications link 1426 and to the management network 1424 via communications network 1428.

The controller 1406 operates to configure and manage the private cloud system. The controller 1406 is coupled to the inside private network 1420 via communications link 1430 and the management network 1424 via communications link 1432. In some embodiments, the controller includes an orchestrator device or module, a Virtual Network Function manager device or module, and an element management system device or module. The orchestrator controls the orchestration and management of network function virtualized infrastructure and software resources, and realizing network services on network function virtualized infrastructure. The Virtual Network Function manager device or module operates to control virtual network function lifecycle management including for example instantiation, update, query and termination. A virtual network function as described in the ETSI GS NFV 002 V1.1.1 is a virtualisation of a network function. In this example, the virtualized network functions are session border controllers. The element management system or module performs management functions for one or several of the virtual network functions, e.g., virtual SBCs. Each compute node includes one or more processors. In some embodiments, one or more of the compute nodes in the system include a single processor upon which multiple virtual SBCs of the cluster are instantiated. In some embodiments, each virtual SBC of the cluster is a set of programming instructions forming a SBC application which is executed on a processor of a compute node.

The SIP application server 1414 is coupled to the inside private network 4120 via communications link 1468.

The SIP Endpoint device 1 is coupled to the outside private network 1422 via communications link 1452. The SIP Endpoint 2 1418 is coupled to the outside private network 1422 via communications link 1454. In some embodiments, the system 1400 also includes a DNS server which performs the functions the same as or similar to the DNS server 114 illustrated in FIGS. 1 and 2.

The methods and steps described in connection with FIGS. 1, 2, 7, 8, 9, 10, 11, 12, and 13 may also be implemented on the private cloud system 1400 of FIG. 14.

Figures 7, 7A, 7B:
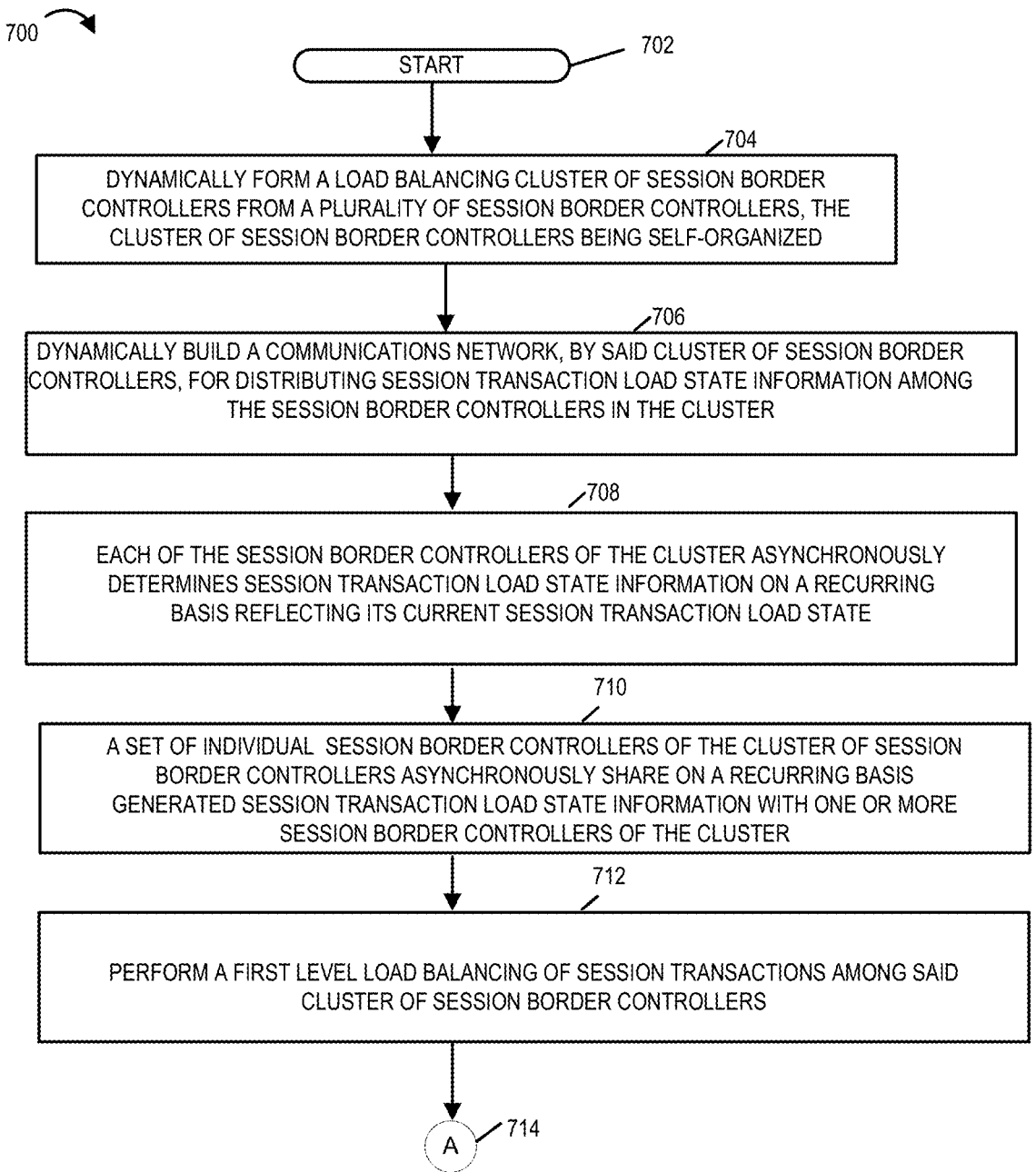
FIG. 7 illustrates the combination of FIGS. 7A and 7B.
FIG. 7A illustrates a first part of an exemplary method of load balancing SIP session transactions among a self-organized cluster of session border controllers in accordance with an embodiment of the present invention.
FIG. 7B illustrates a second part of an exemplary method of load balancing SIP session transactions among a self-organized cluster of session border controllers in accordance with an embodiment of the present invention.
Figure 7B:
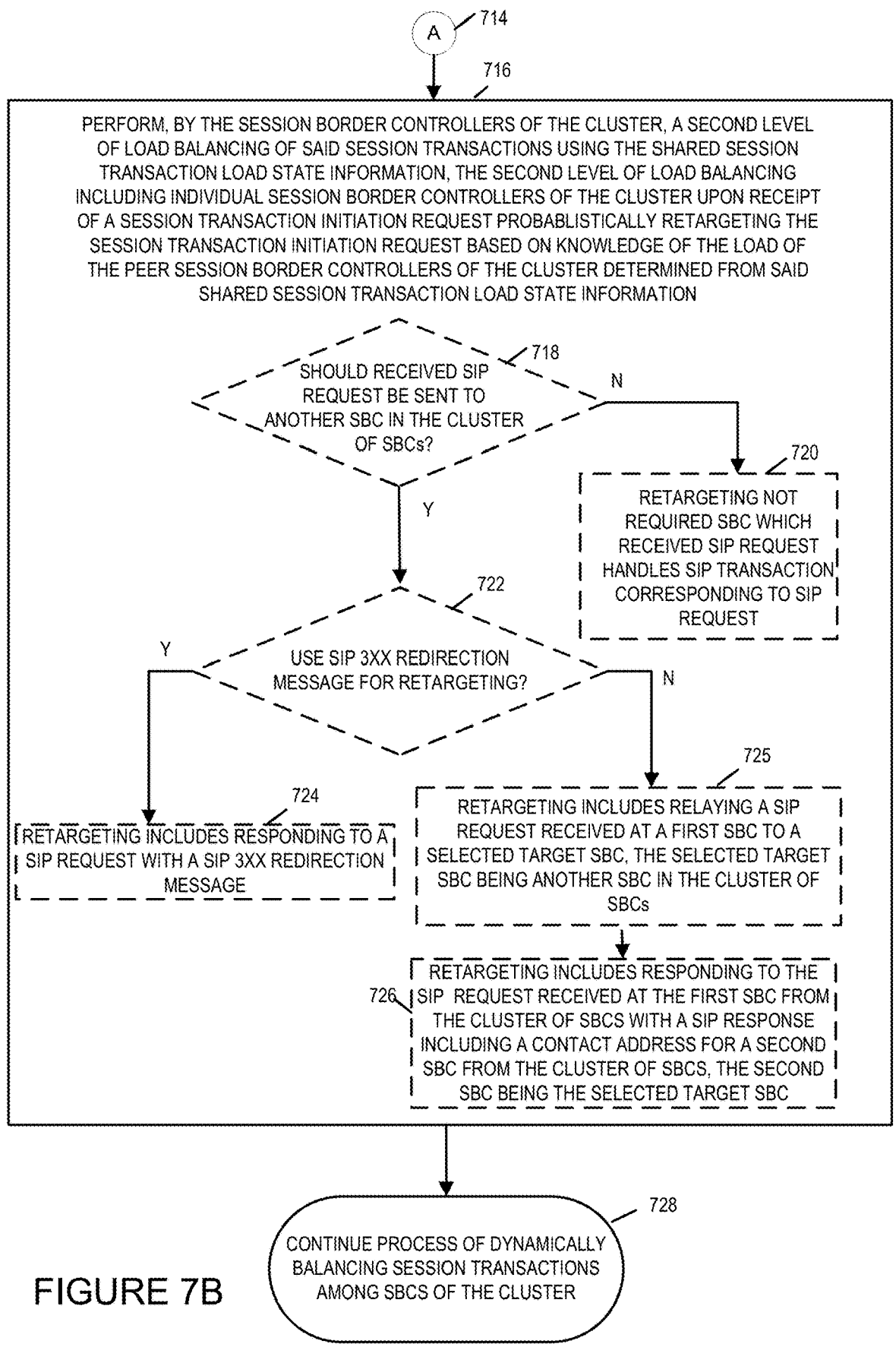

FIG. 7 comprises FIGS. 7A and 7B. Flowchart 700 shown in FIG. 7 illustrates an exemplary method embodiment of load balancing Session Initiation Protocol session transactions among a self-organized cluster of SIP processing devices which in this example are session border controllers. The use of session border controllers is only exemplary as the method is applicable to other SIP processing devices such as for example SIP application server devices and SIP proxy devices. The method will be now be described in connection with system 100 of FIG. 1 for explanatory purposes. It will be appreciated that the method is applicable to other systems.

FIG. 7A illustrates a first part of an exemplary method of load balancing Session Initiation Protocol session transactions among a self-organized cluster of session border controllers in accordance with an embodiment of the present invention.

FIG. 7B illustrates a second part of an exemplary method of load balancing Session Initiation Protocol session transactions among a self-organized cluster of session border controllers in accordance with an embodiment of the present invention.

At a high level, the overall method can be summarized as a self-organizing cluster of SBCs dynamically building a mesh communications network for distributing information across all the SBCs of the cluster. Each of the SBCs of the cluster determine and share load state information, e.g., session transaction load state information, with the other SBCs of the cluster which are sometimes referred to as peer SBCs of the cluster. A first level of SIP load balancing occurring through either DNS based mechanisms or a loosely coupled front-end load balancer. A second level of SIP load balancing occurring by the SBCs probabilistically retargeting received requests based on their knowledge of peer SBC loads at the other SBC peers of the cluster.

The method 700 begins in start step 702 shown on FIG. 7A. Operation proceeds from start step 702 to step 704. In step 704, a load balancing cluster of session border controllers (SBCs) is dynamically formed from a plurality of session border controllers. The cluster of session border controllers is self-organized. Operation proceeds from step 704 to step 706.

In step 706, the cluster of session border controllers dynamically builds a communications network for distributing session transaction load state information among the session border controllers in the cluster. In some embodiments, the communications network is a non-partitioned network. In some embodiments, the communications network is a mesh network. Operation proceeds from step 706 to step 708.

In step 708, each of the session border controllers of the cluster asynchronously determines or generates session transaction load state information on a recurring basis reflecting its current session transaction load state. In some embodiments, the method/routine 800 illustrated in FIG. 8 which is discussed in further detail below is implemented by SBCs of the cluster to determine their respective session transaction load state information. Operation proceeds from step 708 to step 710.

In step 710, a set of individual SBCs of the cluster of session border controllers asynchronously share on a recurring basis generated or determined session transaction load state information with one or more session border controllers of the cluster. In some embodiments, the set of individual SBCs of the cluster includes less than all of the SBCs in the cluster. In some embodiments the set of individual SBCs of the cluster includes all of the SBCs in the cluster. In some embodiments, the individual SBCs of the cluster share the generated or determined session transaction load state information by transmitting it to one or more of the SBCs in the cluster. In some embodiments, the individual SBCs share the generated or determined session transaction load state information by storing the information in a storage device which is accessible by all of the SBCs in the cluster. In some embodiments, sharing of the SBC's session transaction load state information with other SBCs of the cluster may be performed indirectly. For example, a first SBC may share its session transaction load state information with a second SBC of the cluster which shares it with a third SBC of the cluster. In some embodiments, the individual SBCs of the cluster share the generated or determined session transaction load state information by transmitting the information to a designated leader SBC which distributes the shared session transaction load state information with the SBCs of the cluster. In some embodiments, the set of individual SBCs of the cluster for which session transaction load state information is shared includes only those SBCs having the greatest amount of slack capacity, for example the top 20% of SBCs of the cluster ranked by slack capacity, the percentage utilized being configurable and dynamically adjustable. For example, as the load on the cluster increases and/or exceeds a certain threshold the percentage increases whereas when the load decreases and/or falls below a certain threshold the percentage decreases. In some embodiment, the recurring basis is a predetermined periodic interval such as for example, e.g., 5 seconds. In some embodiments, the periodic interval is configurable. In some embodiments, the periodic internal is fixed by an Element Management System device and is downloaded to each of the SBCs of the cluster. In some embodiments, the recurring basis is based on the slack capacity of the individual SBCs. Operation proceeds from step 710 to step 712.

In step 712, a first level load balancing of session transactions among said cluster of session border controllers is performed. In some embodiments, the first level load balancing is performed without knowledge of the session transaction load state information for the SBCs of the cluster. In some embodiments, the first level load balancing is performed by a front end load balancing device, a peer device, a peer device using Domain Name System (DNS) based distribution, or round-robining among multiple routes. In some embodiments, this first level of load balancing does not require knowledge of the load state information for the session border controllers of the cluster. In some such embodiments, the DNS communications server 114 performs the first level load balancing using a round robin distribution operation among the SBCs of the cluster. Operation proceeds from step 712 to step 716 shown on FIG. 7B via connection node A 714.

In step 716, a second level of load balancing is performed by the session border controllers of the cluster using the shared session transaction load state information. The second level load balancing includes individual session border controllers of the cluster upon receipt of a session transaction initiation request probabilistically retargeting the session transaction initiation request based on knowledge of the load of the peer session border controllers of the cluster determined from the shared session transaction load state information.

In some embodiments, the session transaction load state information for a session border controller corresponds to the slack capacity at the session border controller. In some such embodiments, the slack capacity includes at least one of call capacity and registration capacity. In some embodiments, the session transaction load state information for a SBC corresponds to the slack capacity, the slack capacity corresponding to a session transaction capacity. In some embodiments, the slack capacity is normalized by the SBC before it is shared with the other SBCs (i.e., the peer SBCs) of the cluster.

Step 716 in some embodiments includes one or more sub-steps 718, 720, 722, 724, 725 and 726. In sub-step 718 a determination is made as part of the retargeting as to whether a received SIP request, e.g., SIP INVITE request message, should be sent to another SBC in the cluster of SBCs based on the SBC's own session transaction load state information and the session transaction load state information shared by the other SBCs in the cluster. If the determination is made that the received SIP request should be sent or redistributed to another SBC in the cluster of SBCs to effectuate load balancing of the SIP transactions among the SBCs of the cluster, then operation proceeds from determination sub-step 718 to sub-step 722. If the determination is made that the received SIP request does not require retargeting, that is redistribution to another SBC in the cluster of SBCs to effectuate load balancing, then operation proceeds from determination sub-step 718 to sub-step 720.

In sub-step 720, as retargeting and redistribution of the SIP request is not required for load balancing of the SIP transactions, the SBC which received the SIP request handles or processes the SIP transaction corresponding to the request.

When the determination in step 718 is that the SIP request received at the SBC should be sent to another SBC for load balancing, operation proceeds from sub-step 718 to determination sub-step 722 as previously described. In determination sub-step 722, a determination is made as to whether to use a SIP 3XX redirection message for retargeting and redistributing the received SIP transaction request. This decision may be, and often is, determined by the system configuration settings. In some embodiments, these system configuration settings are downloaded to the individual SBCs of the cluster from the Element Management System 120. In some embodiments, the decision is based on whether the redistribution of SIP session transactions is intended to be completely transparent to the computing devices sending the SIP transaction requests (e.g., peer SBC 122 in FIGS. 1 and 2). That is the computing devices such as the peer SBC 122 in FIGS. 1 and 2 sending the SIP transaction requests will not receive SIP 3XX redirection requests which otherwise would alert them that the targeted SBC to which the request was sent is not handling the request. When the determination is that the SIP 3XX redirection message is to be used for retargeting operation proceeds from sub-step 722 to sub-step 724.

In sub-step 724, retargeting of the SIP request is performed to redistribute the SIP transaction to another SBC in the cluster of SBCs. As part of the retargeting process, a SIP 3XX response redirection message is generated and sent to the requesting device in response to the received SIP request. The SIP 3XX retargeting message includes the address of the peer SBC in the cluster to which the SIP request should be sent therein re-distributing the SIP transaction load among the SBCs of the cluster. Operation proceeds from step 716 to step 728.

When the decision in sub-step 722 is that a SIP 3XX redirection message is not to be used operation proceeds from sub-step 722 to sub-step 725. In sub-step 725, retargeting of the SIP request is performed to redistribute the SIP transaction to another SBC in the cluster of SBCs. As part of the retargeting process, the SBC that received the SIP request which we shall refer to as the first SBC proxies or relays the received SIP request to a selected target SBC, the selected target SBC being another SBC in the cluster of SBCs. The target SBC being the SBC determined to be the better target for the session transaction. In some embodiments, the target SBC is determined via the method 900 described below in connection with FIG. 9. Operation proceeds from sub-step 725 to sub-step 726.

In sub-step 726, as part of the retargeting process the first SBC which received the SIP request responds to the SIP request it received with a SIP response including a contact address for a second SBC from the cluster of SBCs, the second SBC being the selected target SBC.

In this way, the SIP session transactions are distributed among the SBCs of the cluster to redistribute the SIP session transaction loads. The second SBC handles the session transaction corresponding to the SIP request, e.g., SIP INVITE message, so that the SIP session transaction load is distributed among the SBCs of the cluster. The retargeting of the SIP request is performed and achieved without use of proprietary messages, extensions or message fields. Operation proceeds from step 716 to step 728.

In step 728, the process of dynamically balancing session transaction among SBCs of the cluster continues as described above.

The features of clustering and determining a leader from among a group of SBCs will now be discussed in further detail. In an exemplary SIP load balancing embodiment, where the SBCs 104, 106, 108, 110, and 112 are virtual instances in the cloud 101, the SBC instances within the cloud arrange themselves into one or more load balancing clusters (LBC) based on configuration. In this example, the SBC instances arrange themselves into a single cluster 102. The load balancing cluster contains one or more seed nodes (i.e., SBC instances), with these seed nodes (SBC instances) identified by a Fully Qualified Domain Name (FQDN) or IP addresses. The FQDN or IP addresses are part of the load balancing cluster configuration for the instance. In some embodiments, the specific nodes (SBCs) matching this FQDN are added by the Orchestrator 118 or Virtual Network Function Manager (VNFM) 116 while dynamically creating the SBC instances. Starting from these seed nodes, the SBC instances of a LBC dynamically elect one or more leaders. The election of the leader is determined using a bootstrap process starting from the seed nodes (SBCs). Bully resolution is used for resolving conflicts. The process is such that within a bounded time (dependent on the cluster size that is the number of SBCs in the cluster), all SBC instances of the load balancing cluster agree on the leader set. This leader set is tracked continuously. When any leader fails, a new election is invoked to select a replacement leader.

Features of load state sharing will now be discussed in further detail. In some embodiments, the load balancing application uses the leader set as the distribution point for the loading information. The individual SBC instances on a recurring basis and/or periodically send the slack capacity across multiple dimensions to its leader. For example, two dimensions of the slack capacity are: (1) call capacity and (2) registration capacity. Call capacity referring to session transaction relating to calls such as for example VOIP calls. However, additional slack capacity or resource utilization dimensions may, and in some embodiments are, used. For example in some embodiments, the type of session and resources required are included as dimensions such as media sessions requiring transcoding vs. media sessions which do not require transcoding but are instead pass through sessions. The leaders then exchange the information amongst themselves with the end result being that the leader set contains the full loading information across the load balancing cluster. Note that while this is sometimes described as a complete data set, the important entities are the ones with the highest available capacity. Consequently, the leaders may optimize by pruning the set to the ones to the top N entities by dimension.

The first level load balancing feature will now be discussed in further detail. The system's architecture is independent of the method used for the first level load balancing. In some environments, a front-end SIP-aware load balancer can be used. This load balancer can randomly distribute load on a SIP transaction-by-transaction basis. Note that for calls, only the initial INVITE transaction would go through the front end load balancer. If the call is accepted, the 200 INVITE would contain the contact information of the accepting SBC. Thereafter, all SIP messaging, including the ACK, will go directly to the SBC instance. However, this front end approach is not optimal and/or practical for certain applications. These include cases such as access with symmetric Network Address Port Translation devices in the path, and encrypted transport. A more general solution involves the use of DNS-based load balancing as described in Internet Engineering Task Force (IETF) Request for Comment (RFC) 3263 Session Initiation Protocol (SIP): Locating SIP Servers published in 2002. Here, the first level load balancing is done by the peers through the SRV/NAPTR/A-record resolution. The load balancing can be done either by using multiple SRV records for the service, or multiple A records for the FQDN. Regardless of the approach chosen, the salient feature here is that the first-level load balancing need only be approximate and, hence, no coupling between this load balancing and the SBC instance state is necessary. This allows for a wide variety of techniques to be used for the first level of load balancing and allows various customers/network operators to choose which ever solution they desire while still being able to achieve good overall load balancing of the SIP transaction among the SBC instances in the cluster.

The second level load balancing feature will now be discussed in further detail. The second level load balancing is performed by the SBC instances themselves using the state information exchanged across the cluster as described above. When a request comes in, the SBC randomly decides whether to accept the call locally or whether to retarget the call to a peer. This random selection is pruned and weighted by the availability among the local SBC and its peer SBCs in the cluster. When the peer SBCs in a cluster are roughly equally loaded, the algorithm has a very low probability of retargeting. However, when the SBCs are mismatched, then the probability of retargeting increases, leading to a rebalancing of load across the SBCs of cluster.

The basic operation is simple, but the algorithm is complicated by adjustments to avoid problems in various scenarios. This is probably best explained by example starting from the core operation and then iteratively adding in the adjustments. Consider a four SBC cluster and suppose that the call availability on A, B, C, and D is 100, 100, 1000, and 800 respectively. This might be case for example if SBC C and D was very recently added to the cluster. Suppose a new call arrives at SBC A. SBC A will have the availabilities of SELF (100), B (100), C (1000), and D (800). The core operation is for SBC A to decide where to handle the call by randomly picking among the choices with weighting. So using this example, the call will be handled by SELF (probability 0.05), B (probability 0.05), C (probability 0.5) and D (probability 0.4).

However, this approach will lead to unnecessary retargeting unless adjustments are made to the retargeting decision algorithm. Retargeting is an undesirable operation. With the 3xx approach, it is more costly since the call will be retried. Furthermore, it is not at all transparent to the peer, and it clearly shows up in external signaling. In the above example, both A and B have equal slack but 5% of calls to A will be retargeted to B, and vice-versa. Retargeting is intended for situations where a significant mismatch has developed. Assume that only differences of 20% or higher are considered significant enough to require rebalancing. Continuing with the same example, SBC A will prune out entries which are within 1.2× the local capacity. This leaves a selection set of SELF (100), C (1000), and D (800). Now picking among the choices randomly with weighting gives targets of SELF (p:0.053), C (p:0.526), and D (p:0.421)

The next issue can be more easily seen if one considers a more extreme case. Suppose that instead of just SBC A and SBC B with a slack capacity of 100, suppose there are 50 such SBCs. Each of these SBCs would end up with the selection set of SELF (100), C (1000), and D (800) along with targeting probabilities of C (p:0.526) and D (p:0.421). The end result is that from an aggregate perspective, the retargeting behavior towards C, for example, is as if C had a slack capacity of 50K, not 1000. To mitigate this effect, the available capacity has to be loosely divided among potential re-targeters. To do this, the algorithm divides the slack by the cluster size. Returning to the original example, with the cluster size of 4, the selection set after cluster size adjustment becomes SELF (100), C (250), and D (200). Now the targeting gives targets of SELF (p:0.181), C (p:0.456) and D (p:0.363).

An exemplary method of computing slack capacity will now be described in further detail. The retargeting examples discussed above are all based on a node/SBC knowing its SBC peers' slack capacity (that is the capacity of the other SBCs in the cluster). If an instance has a call capacity of 1000, and there are no active calls, then its slack capacity is 1000. But there is a subtle problem with this simplistic approach. Consider the example from the previous section. Let's assume that without retargeting, all the SBC instances are receiving 1K cps (thousand calls per second). Both SBC A and SBC B will be retargeting 45% of their requests towards C. This results in C receiving 1.9K cps. Now, let's assume that SBC C actually advertises slack capacity of 10K instead of 1000. The retarget probabilities for A and B now becomes SELF (p:0.036), C (p:0.893), and D (p:0.071). Now, the resulting rate at C becomes 2.8K cps. The effect becomes worse as the differential goes up and also as the number of nodes/SBC instances increases.

The solution implemented to overcome this problem in an exemplary embodiment is that the computation of slack capacity must take into account two dimensions. First, there is the count-based slack capacity which is as described above, namely the difference between current active calls (or registrations) and maximum calls (or registrations). The second dimension is rate-based slack capacity. For explanatory purposes suppose that the system is configured to use 1 minute intervals, the average allowed rate over the interval is R cps, and that the current call arrival rate is 0.25R cps. The rate-based slack capacity would then be 0.75R×60. The advertised slack capacity that is shared should then be the minimum of the count-based and rate-based values. This effectively ensures that an SBC instance only asks for additional load when the current load would not be sufficient to fully utilize its capacity within the upcoming interval.

The method of retargeting requests feature will now be discussed in further detail. The method described above generically uses "retargeting" to move the load to another SBC instance. As explained above different options are possible here. In the first option a SIP 3xx based retarget is used to force the request away. The SIP 3xx behavior is well understood for calls and has been part of the SIP standards since the predecessor to IETF RFC 3261 "SIP: Session Initiation Protocol" published in 2002. The behavior for 3xx on registrations is less specified in the RFCs. While it does cause the initial register to be retargeted, it is not specified whether refresh registers continue with the retargeted peer. However, use cases with common application servers require this behavior and many endpoints do in fact use this approach.

The 3xx based retargeting however is not transparent to the network peer/device, e.g., SBC peer 122 in FIG. 1, that sent the SIP request and, in fact, introduces additional load on the peer/device that sent the SIP request. In some embodiments, internal retargeting is performed instead of SIP 3xx based retargeting. The internal retargeting uses a proxying or relay function. Suppose that SBC A and SBC B are in the same cluster. SBC A receives the INVITE request and determines that SBC B should handle the request. SBC A will proxy the INVITE to SBC B. The provisional responses from SBC B will first come back to SBC A which will in turn send the response to the peer/device that sent the request. The 200 final response from SBC B will follow a similar path. However, the contact address will be for SBC B. Consequently, the peer/device that sent the request will send the ACK (and all future requests) directly to SBC B and SBC A is eliminated from the call path. Users familiar with the SIP protocol will recognize this as standard flow for a non-record-routing SIP proxy. No special behavior on the part of the peer/device sending the request is required.

Steps 1 through 9 on FIG. 1 illustrate exemplary method steps for retargeting using SIP 3xx messages to achieve SIP load balancing among the SBCs of a cluster in accordance with one embodiment of the present invention. In step 1 of the method the SBC 104, 106, 108, 110 and 112 of the cluster of SBCs 102 share with each other state information, e.g., session transaction load state information. Each SBC advertises to or shares with the other SBCs in the cluster its determined SBC load state information which includes the minimum of the count-based and rate-based slack capacity values. Operation proceeds from step 1 to step 2. In step 2, peer SBC 122 which is not part of the cluster 102 generates and sends a NAPTR/SRV/AAAA Request message 130 to the Domain Name System Server 114 to request the resolution of multiple records in response to receiving a SIP Invite request. After the DNS 114 resolves the multiple target address operation proceeds to step 3. In step 3 the DNS 114 sends a NAPRT/SRV/AAAA response message 132 with multiple targets. The multiple targets being multiple contact addresses for the SBCs in the cluster 102. In this example, the peer SBC 122 performs the first level load balancing in step 4. Operation proceeds from step 3 to step 4. In step 4, the peer SBC 122 picks 1 target SBC from the multiple targets in the response message 132 received from the DNS server 114. In this example, the peer SBC 122 picks SBC 104 as the target SBC. Operation proceeds from step 4 to step 5. In step 5, the peer SBC 122 sends a SIP INVITE message 134 to the target SBC 104. Operation proceeds from step 5 to step 6. In step 6, the target SBC 104 in response to receiving the SIP INVITE message 134 determines or picks another SBC in the cluster to which the SIP INVITE message 134 is to be retargeted. In step 6, the SBC 104 determines based on the SIP session state information shared by the other SBCs of the cluster that SBC 108 is underutilized. SBC 104 as part of step 6 determines that the received SIP INVITE message 134 should be retargeted to SBC 108 which is underutilized. Operation proceeds from step 6 to step 7. In step 7, SBC 104 sends a SIP 3XX INVITE response message 136 to peer SBC 122 in response to the SIP INVITE message 134. This SIP 3XX INVITE response 136 includes the contact address for the retargeted SBC 108. Operation proceeds from step 7 to step 8. In step 8, the peer SBC 122 sends a SIP INVITE message 140 to SBC 108. Operation proceeds from step 8 to step 9. In step 9, the SBC 108 sends a 200 OK INVITE response message 141 to the peer SBC 122 in response to the SIP INVITE message 140. The session transaction corresponding to the SIP INVITE will be processed by SBC 108.

Steps 1 through 10 on FIG. 2 illustrate exemplary method steps when internal cluster retargeting is performed to achieve SIP load balancing among the SBCs of a cluster in accordance with an alternative embodiment of the present invention. In this alternative embodiment a SIP proxying or relay function is performed by the initial SBC recipient of the SIP request. In step 1 of the method the SBC 104, 106, 108, 110 and 112 of the cluster of SBCs 102 share with each other state information, e.g., session transaction load state information. Each SBC advertises to or shares with the other SBCs in the cluster its determined SBC load state information which includes the minimum of the count-based and rate-based slack capacity values. Operation proceeds from step 1 to step 2. In step 2, peer SBC 122 which is not part of the cluster 102 generates and sends a NAPTR/SRV/AAAA Request message 130 to the Domain Name System Server 114 to request the resolution of multiple records in response to receiving a SIP Invite request. After the DNS 114 resolves the multiple target address operation proceeds to step 3. In step 3 it sends a NAPRT/SRV/AAAA response message 132 with multiple targets, the multiple targets being multiple contact addresses for the SBCs in the cluster 102. In this example, the peer SBC 122 performs the first level load balancing in step 4. Operation proceeds from step 3 to step 4. In step 4, the peer SBC 122 picks 1 target SBC from the multiple targets in the response message received from the DNS server 114. In this example, the peer SBC 122 picks SBC 104 as the target SBC. Operation proceeds from step 4 to step 5. In step 5, the peer SBC 122 sends a SIP INVITE message 134 to the target SBC 104. Operation proceeds from step 5 to step 6. In step 6, the target SBC 104 in response to receiving the SIP INVITE message 134 determines or picks another SBC in the cluster to which the SIP INVITE message 134 is to be retargeted. In step 6, the SBC 104 determines based on the SIP session state information shared by the other SBCs of the cluster that SBC 108 is underutilized. SBC 104 as part of step 6 determines that the received SIP INVITE message 134 should be retargeted to SBC 108 which is underutilized. Operation proceeds from step 6 to step 7. In step 7, the SBC 104 acts a SIP proxy and forwards or relays the SIP INVITE 134 to SBC 108 (the identified underutilized SBC in the cluster to which the received SIP INVITE 134 is to be retargeted). In some embodiments, as part of the relay process the SIP INVITE message is reformatted as SIP INVITE 150. Operation proceeds from step 7 to step 8. In step 8, the SBC 108 sends a 200 Ok response message 152 in response to the SIP INVITE message 150 to SBC 104 which is operating as a SIP proxy. Operation proceeds from step 8 to step 9. In step 9, the SBC 104 sends a SIP 200 OK INVITE response message 154 to the peer SBC 122 in response to the SIP INVITE message 134 SBC 104 received from the peer SBC 122. The SIP 200 OK INVITE response message includes the contact information/address for the SBC 108. Operation proceeds from step 9 to step 10. In step 10, the peer SBC 122 sends a SIP ACK message 156 directly to the SBC 108 in response to the SIP 200 OK INVITE response message 154 using the contact information/address received from SBC 104 in the SIP 200 OK INVITE response 154. All future requests corresponding to the session will be sent directly to SBC 108 as SBC 104 is eliminated from the session, e.g., call session, path.

Figures 8, 8A:
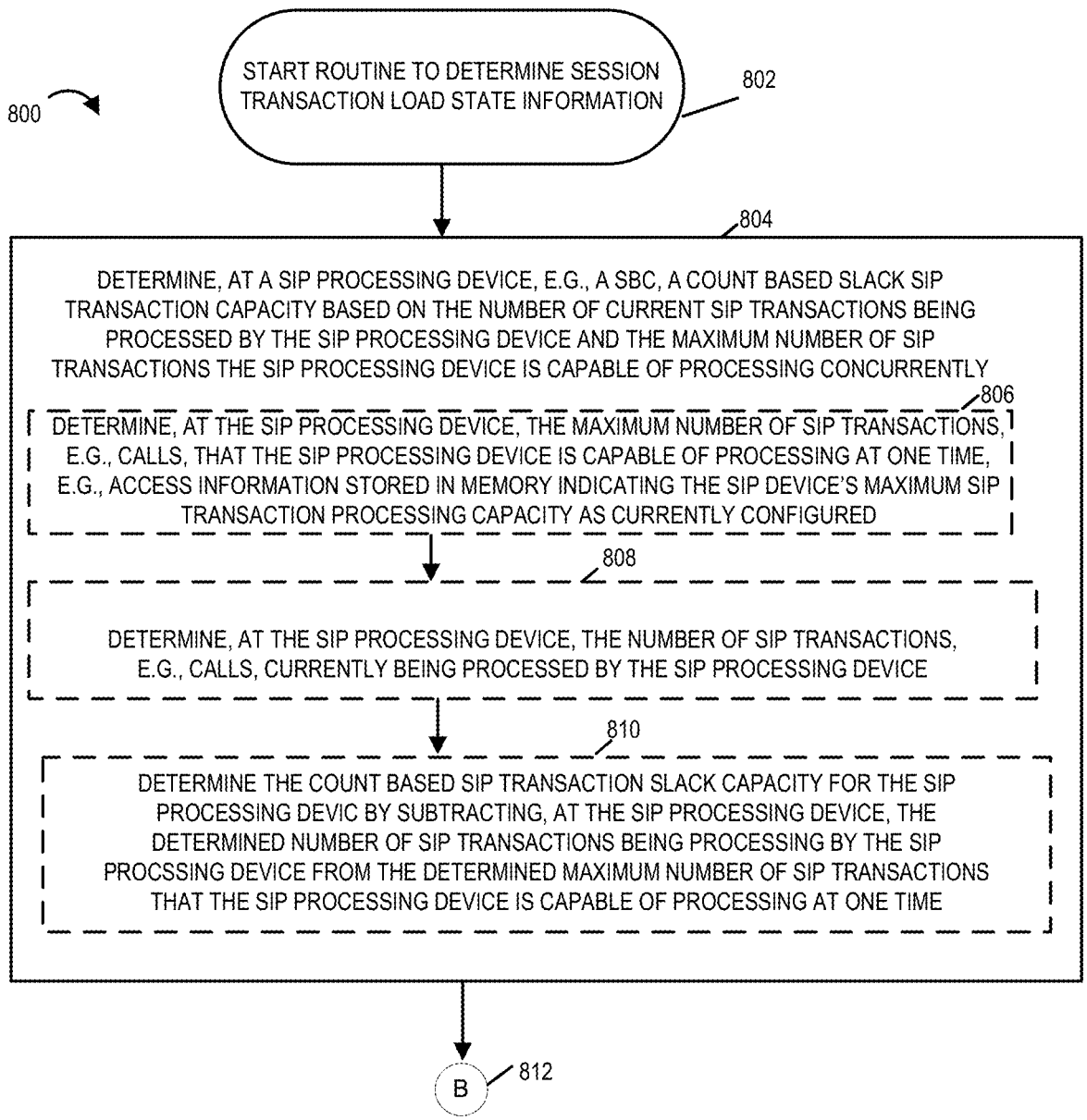
FIG. 8 illustrates the combination of FIGS. 8A and 8B.
FIG. 8A illustrates a first part of an exemplary method of generating/determining a SIP processing device's session transaction load state information in accordance with an embodiment of the present invention.
Figure 8B:
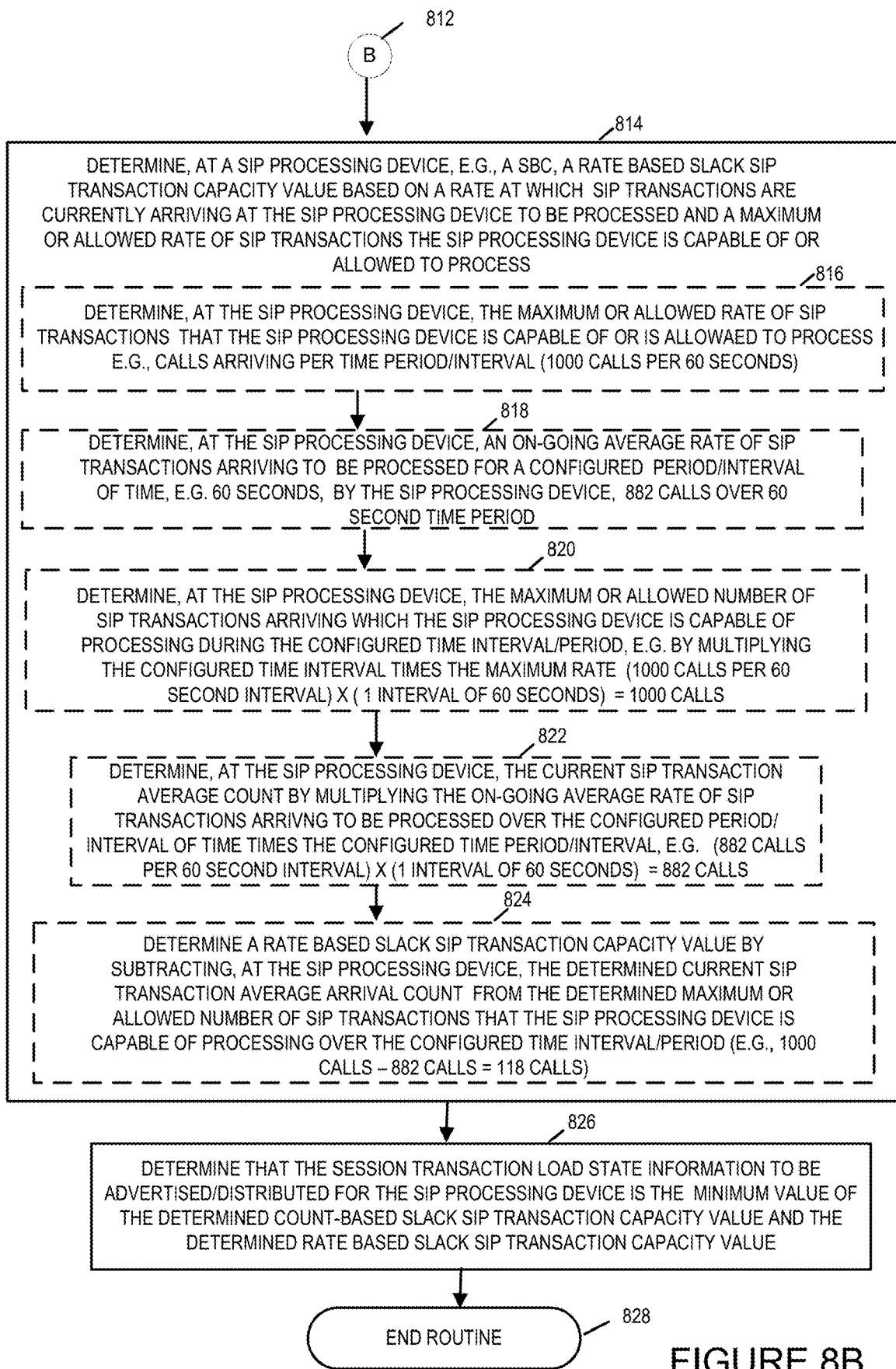
FIG. 8B illustrates a second part of an exemplary method of generating/determining a SIP processing device's session transaction load state information in accordance with an embodiment of the present invention.

An exemplary method/routine 800 to determine/generate, by a SIP processing device, its session transaction load state information is illustrated in FIG. 8 and will now be discussed. FIG. 8 comprises the FIGS. 8A and 8B. FIG. 8A is a first part of an exemplary method 800 illustrating the steps of generating/determining a SIP processing device's session transaction load state information. FIG. 8B is a second part of an exemplary method 800 illustrating the steps of generating/determining a SIP processing device's session transaction load state information. In some embodiments, the SIP processing devices is a SBC. In some embodiments, the SIP processing device is a SIP proxy device. In some embodiments, the SIP processing device is a SIP application server. In some embodiments, the SBCs 104, 106, 108, 110, and 112 of the cluster 102 implement the method 800 to determine their respective session transaction load state information on a recurring basis.

Method/routine 800 starts in start step 802 shown on FIG. 8A. Operation proceeds from start step 802 to step 804. In step 804, the SIP processing device determines a count based slack Session Initiation Protocol (SIP) transaction capacity based on the number of current SIP transactions being processed by the SIP processing device and the maximum number of SIP transactions the SIP processing device is capable of processing concurrently. In some embodiments, step 804 includes sub-steps 806, 808, 810. In sub-step 806, the SIP processing device determines the maximum number of SIP transactions, e.g., calls, that the SIP processing device is capable of processing at one time. For example, by accessing information stored in memory indicating the SIP processing device's maximum SIP transaction processing capacity/capability as currently configured. Different hardware and/or software configurations can result in different maximum SIP transaction processing capacities/capabilities for the same device. Operation proceeds from sub-step 806 to sub-step 808.

In sub-step 808, the SIP processing device determines the number of SIP transactions, e.g., calls, currently being processed by the SIP processing device. Operation proceeds from sub-step 808 to sub-step 810.

In sub-step 810, the SIP processing device determines a count based SIP transaction slack capacity for the SIP processing device by subtracting the determined number of SIP transactions being processed by the SIP processing device from the determined maximum number of SIP transactions that the SIP processing device has the capacity to/is capable of processing at one time. Operation proceeds from step 804 shown on FIG. 8A to step 814 shown on FIG. 8B via connection node B 812.

In step 814, the SIP processing device determines a rate based slack SIP transaction capacity value based on a rate at which SIP transactions are currently arriving at the SIP processing device to be processed and a maximum or allowed rate of SIP transactions the SIP processing device is capable of or allowed to process. In some embodiments, the step 814 includes sub-steps 816, 818, 820, 822, and 824.

In sub-step 816, the SIP processing device determines the maximum or allowed rate of SIP transactions that the SIP processing device is capable of or is allowed to process, e.g., calls arriving per time period/interval such as 1000 calls per 60 seconds. In some embodiments, this step includes the SIP processing device accessing memory to determine its maximum SIP transaction processing rate based on its current hardware/software configuration. Operation proceeds from sub-step 816 to sub-step 818.

In sub-step 818, the SIP processing device determines an on-going average rate of SIP transactions, e.g., calls, arriving to be processed for a configured period/interval of time, e.g., 60 seconds, by the SIP processing device, e.g., 882 calls/60 seconds. Operation proceeds from sub-step 818 to sub-step 820.

In sub-step 820, the SIP processing device determines the maximum or allowed number of SIP transactions arriving which the SIP processing device is capable of processing as configured during the configured time interval/period, e.g., by multiplying the configured time interval times the maximum determined rate. E.g., (1000 calls/60 second time interval)(1 time interval of 60 seconds)=1000 calls. Operation proceeds from sub-step 820 to sub-step 822.

In sub-step 822, the SIP processing device determines the current SIP transaction average count by multiplying the on-going average rate of SIP transactions arriving to be processed at the SIP processing device over the configured period/interval of time times the configured time period/interval. E.g., (882 calls per 60 second time interval)(1 time interval of 60 seconds)=882 calls. Operation proceeds from sub-step 822 to sub-step 824.

In sub-step 824, the SIP processing device determines a rate based slack SIP transaction capacity value by subtracting the determined current SIP transaction arrival count from the determined maximum or allowed number of SIP transactions that the SIP processing device is capable of processing over the configured time interval/period. E.g., 1000 calls−882 calls=118 calls. Operation proceeds from step 814 to step 826.

In step 826, the SIP processing device determines that the session transaction load state information to be advertised/distributed/shared for the SIP processing device is the minimum value of the determined count-based slack SIP transaction capacity value and the determined rate based slack SIP transaction capacity value. Operation proceeds from step 826 to 828 where the routine 300 ends. The routine 800 is implemented by the SIP processing device on a recurring basis to determine/generate its session transaction load state information.

Figure 10:
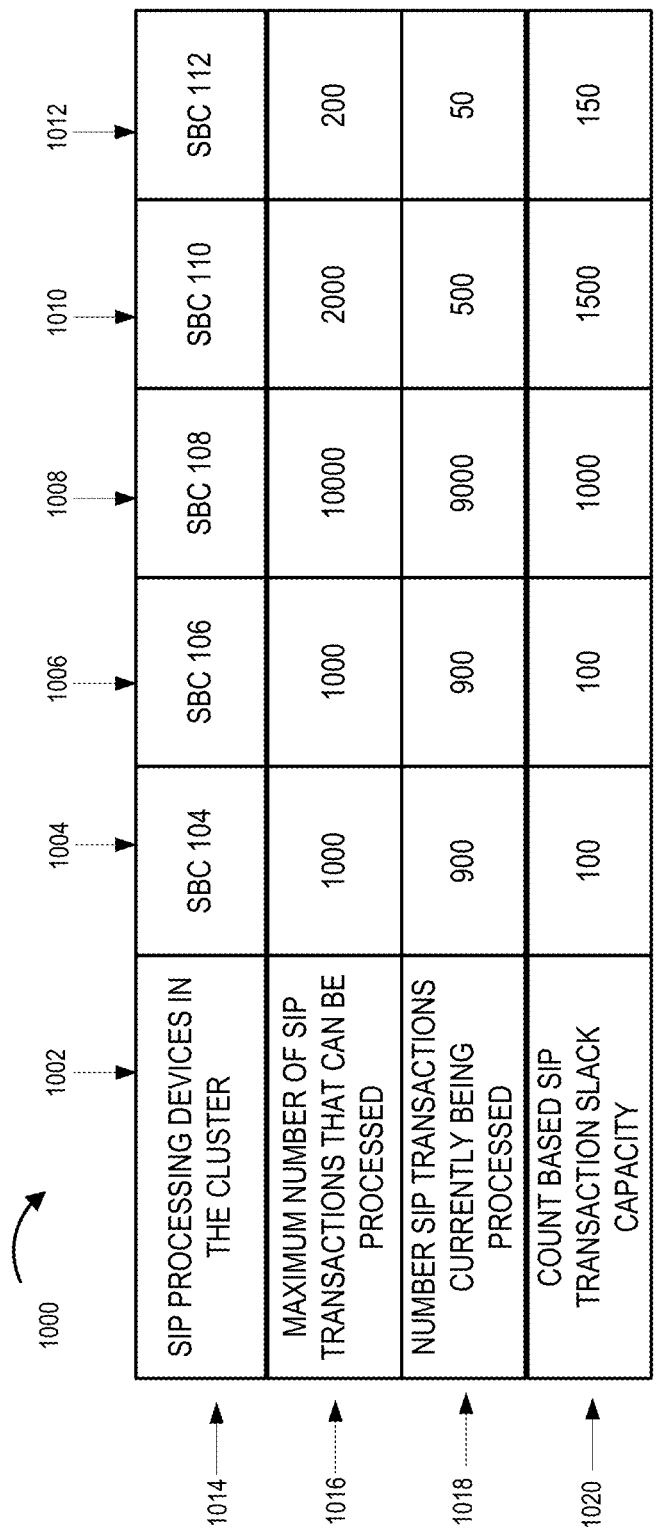
FIG. 10 illustrates an exemplary table of SIP processing device related information including count based SIP transaction slack capacity.

Table 1000 of FIG. 10 illustrates the relationship between the maximum number of SIP transactions that can be processed by a SIP processing device, the number of SIP transactions currently being processed by the corresponding SIP processing device and the corresponding count based SIP transaction slack capacity. In the example of FIG. 10 the SIP processing devices are the session border controllers 104, 106, 108, 110, and 112 of the cluster of session border controllers 102 of exemplary system 100 of FIG. 1. The entries for column 1002 of the table are labels or identifiers which are provided for explanatory purposes. These entries identify the information contained in each of the rows. Each of the columns in the table 1000 contains information relating to a specific SIP processing device in the cluster as stated in table entry (column 1002, row 1014). The entry (column 1002, row 1014) states "SIP processing devices in cluster," as the entries in row 1014 specify a SIP processing device from a cluster. The information contained in column 1004 is for SBC 104, the information contain in column 1006 is for SBC 106, the information contained in column 1008 is for SBC 108, the information contained in column 1010 is for SBC 110, and the information contained in column 1012 is for SBC 112. The entries in row 1016 contain the maximum number of SIP transactions, e.g., calls, that can be processed by the SIP Processing device (row 1016, column 1002 entry). This value may be, and in some embodiments is, based on the hardware and/or software configuration of the device. As previously explained this value may be, and in some embodiments is stored in memory such as a SBC's memory. The entries in row 1018 contain the number of SIP transactions, e.g., calls, currently being processed (row 1018, column 1002 entry). This value is determined or generated by the SIP processing device. The entries in row 1020 contain the count based SIP transaction slack capacity, e.g., calls (row 1020, column 1002 entry). The count based SIP transaction slack capacity value may be generated by the SIP processing device by subtracting the number of SIP transactions currently being processed by the maximum number of SIP transactions that can be processed. As illustrated in the table 1000, the SBC 104 has a maximum number of SIP transactions that can be processed equal to 1000 (row 1016, column 1004 entry), a number of SIP transactions currently being processed equal to 900 (row 1018, column 1004 entry), and a count based SIP transaction slack capacity of 100 (row 1020, column 1004 entry). The SBC 106 has a maximum number of SIP transactions that can be processed equal to 1000 (row 1016, column 1006 entry), a number of SIP transactions currently being processed equal to 900 (row 1018, column 1006 entry), and a count based SIP transaction slack capacity of 100 (row 1020, column 1006 entry). The SBC 108 has a maximum number of SIP transactions that can be processed equal to 10000 (row 1016, column 1008 entry), a number of SIP transactions currently being processed equal to 9000 (row 1018, column 1008 entry), and a count based SIP transaction slack capacity of 1000 (row 1020, column 1008 entry). The SBC 110 has a maximum number of SIP transactions that can be processed equal to 2000 (row 1016, column 1010 entry), a number of SIP transactions currently being processed equal to 500 (row 1018, column 1010 entry), and a count based SIP transaction slack capacity of 1500 (row 1020, column 1010 entry). The SBC 112 has a maximum number of SIP transactions that can be processed equal to 200 (row 1016, column 1012 entry), a number of SIP transactions currently being processed equal to 50 (row 1018, column 1012 entry), and a count based SIP transaction slack capacity of 150 (row 1020, column 1012 entry).

Figure 11:
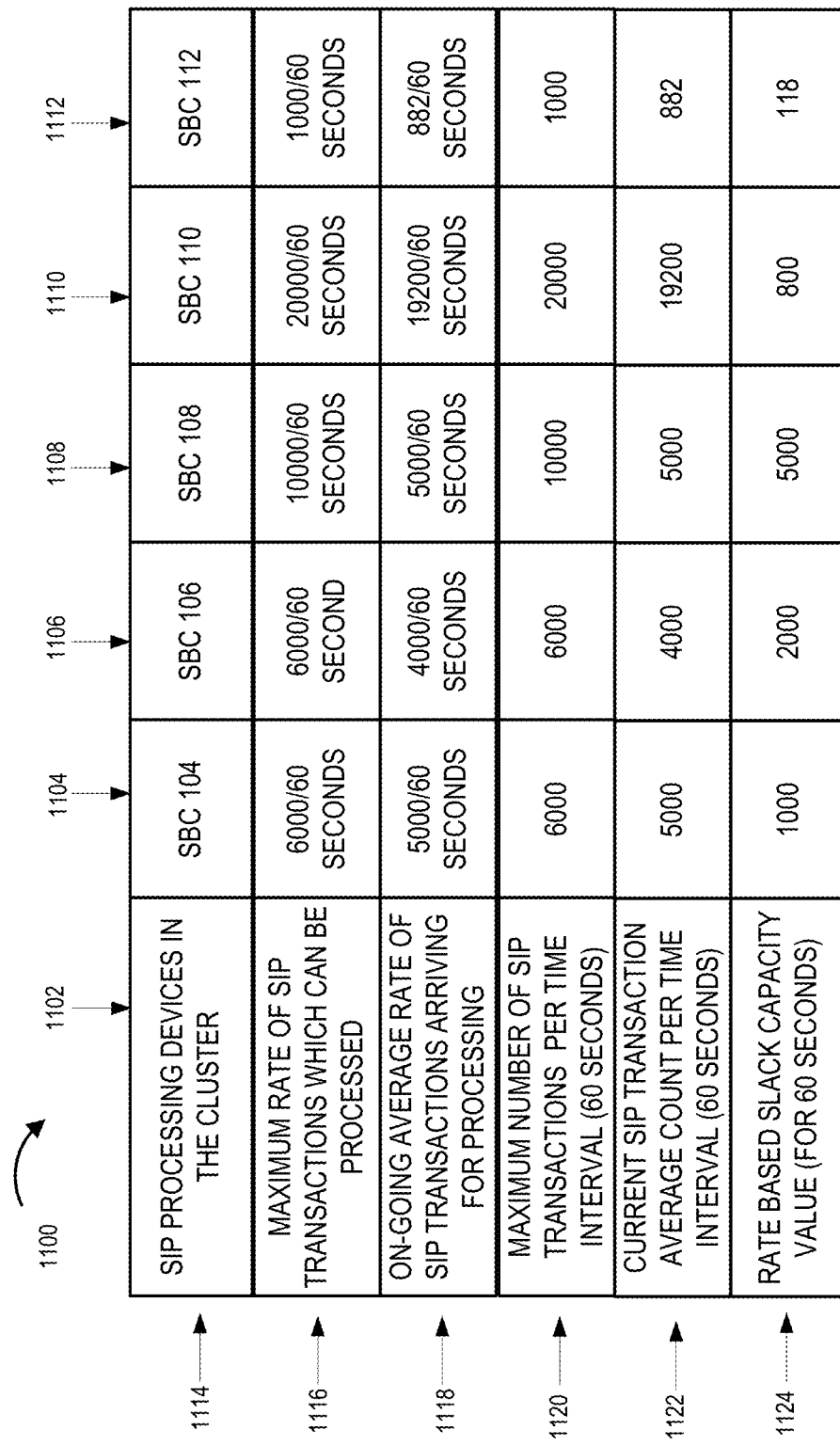
FIG. 11 illustrates an exemplary table of SIP processing device related information including rate based slack capacity.

Table 1100 of FIG. 11 illustrates the relationship between the maximum rate of SIP transaction which a SIP processing device can process for example based on its current software and/or hardware configuration, the on-going rate of SIP transactions arriving for processing at the SIP processing device, the maximum number of SIP transaction per time interval which in this example is 60 seconds, the current SIP transaction average count per time interval which in this example is 60 seconds and the rate based count slack capacity value (for 60 second time interval). In this example, the transactions are for example calls. In the example of FIG. 11, the SIP processing devices are the session border controllers 104, 106, 108, 110, and 112 of the cluster of session border controllers 102 of exemplary system 100 of FIG. 1.

The entries for column 1102 of the table are labels or identifiers which are provided for explanatory purposes. These entries identify the information contained in each of the rows. Each of the columns in the table 1100 contains information relating to a specific SIP processing device in the cluster as stated in table entry (column 1102, row 1114). The entry (column 1102, row 1114) states "SIP processing devices in cluster," as the entries in row 1114 specify a SIP processing device from a cluster. The information contained in column 1104 is for SBC 104, the information contain in column 1106 is for SBC 106, the information contained in column 1108 is for SBC 108, the information contained in column 1110 is for SBC 110, and the information contained in column 1112 is for SBC 112. The entries in row 1116 contain the maximum rate of SIP transactions, e.g., calls per time period which in this example is 60 seconds, that can be processed by the SIP Processing device (row 1116, column 1102 entry). This value may be, and in some embodiments is, based on the hardware and/or software configuration of the device. As previously explained this value may be, and in some embodiments is, stored in memory such as a SBC's memory. The entries in row 1118 contain the on-going average rate of SIP transaction arriving for processing at a SIP processing device, e.g., calls arriving to be processed at SIP processing device over a time period which in this example is 60 seconds (row 1116, column 1102 entry). This value is generated or determined by the SIP processing device. The entries in row 1120 contain the maximum number of SIP transactions per time interval which in this example is 60 seconds (row 1120, column 1102 entry). This value is generated or determined by the SIP processing device by multiplying the maximum rate of SIP transactions which can be processed by the time period/interval. In this example, the time period or interval is 60 seconds. The result is the number of transactions, e.g., calls. The entries in row 1122 contain the current SIP transaction average count per time interval with the time interval in the example being 60 seconds (row 1122, column 1102 entry). This value is generated or determined by the SIP processing device by multiplying the on-going average rate of SIP transactions arriving for processing at the SIP processing device by the time interval, in this example 60 seconds, and is expressed in transaction or calls. The entries in row 1124 contain the rate based slack capacity value for a time period/interval which in this example is 60 seconds (row 1124, column 1102 entry). This value is generated or determined by the SBC by subtracting the current SIP transaction average count per time interval from the maximum number of SIP transaction per time interval.

The table 1100 entries with respect to the SBCs 104, 106, 108, 110 and 112 will now be explained with the SIP transactions being calls and the time interval/period being 60 seconds.

The SBC 104 has a maximum rate of SIP transactions which can be processed of 6000 calls/60 seconds (row 1116, column 1104 entry); an on-going average rate of SIP transactions arriving for processing of 5000 calls/60 seconds (row 1118, column 1104 entry); a maximum number of SIP transactions per time interval (60 seconds) of (6000 calls/60 second interval)(1 interval)=6000 calls (row 1120, column 1104 entry); a current SIP transaction average count per time period/interval (60 seconds) of (5000 calls/60 second interval)(1 interval)=5000 calls (row 1122, column 1104 entry); and a rate based slack capacity value (for a 60 second time period) of (6000 calls)−(5000 calls)=1000 calls (row 1124, column 1104 entry).

The SBC 106 has a maximum rate of SIP transactions which can be processed of 6000 calls/60 seconds (row 1116, column 1106 entry); an on-going average rate of SIP transactions arriving for processing of 4000 calls/60 seconds (row 1118, column 1106 entry); a maximum number of SIP transactions per time interval (60 seconds) of (6000 calls/60 second interval)(1 interval)=6000 calls (row 1120, column 1106 entry); a current SIP transaction average count per time period/interval (60 seconds) of (4000 calls/60 second interval)(1 interval)=4000 calls (row 1122, column 1106 entry); and a rate based slack capacity value (for a 60 second time period) of (6000 calls)−(4000 calls)=2000 calls (row 1124, column 1106 entry).

The SBC 108 has a maximum rate of SIP transactions which can be processed of 10000 calls/60 seconds (row 1116, column 1108 entry); an on-going average rate of SIP transactions arriving for processing of 5000 calls/60 seconds (row 1118, column 1108 entry); a maximum number of SIP transactions per time interval (60 seconds) of (10000 calls/60 second interval)(1 interval)=10000 calls (row 1120, column 1108 entry); a current SIP transaction average count per time period/interval (60 seconds) of (5000 calls/60 second interval)(1 interval)=5000 calls (row 1122, column 1108 entry); and a rate based slack capacity value (for a 60 second time period) of (10000 calls)−(5000 calls)=5000 calls (row 1124, column 1108 entry).

The SBC 110 has a maximum rate of SIP transactions which can be processed of 20000 calls/60 seconds (row 1116, column 1110 entry); an on-going average rate of SIP transactions arriving for processing of 19200 calls/60 seconds (row 1118, column 1110 entry); a maximum number of SIP transactions per time interval (60 seconds) of (20000 calls/60 second interval)(1 interval)=20000 calls (row 1120, column 1110 entry); a current SIP transaction average count per time period/interval (60 seconds) of (19200 calls/60 second interval)(1 interval)=19200 calls (row 1122, column 1110 entry); and a rate based slack capacity value (for a 60 second time period) of (20000 calls)−(19200 calls)=800 calls (row 1124, column 1110 entry).

The SBC 112 has a maximum rate of SIP transactions which can be processed of 1000 calls/60 seconds (row 1116, column 1112 entry); an on-going average rate of SIP transactions arriving for processing of 882 calls/60 seconds (row 1118, column 1112 entry); a maximum number of SIP transactions per time interval (60 seconds) of (1000 calls/60 second interval)(1 interval)=1000 calls (row 1120, column 1112 entry); a current SIP transaction average count per time period/interval (60 seconds) of (882 calls/60 second interval)(1 interval)=882 calls (row 1122, column 1112 entry); and a rate based slack capacity value (for a 60 second time period) of (1000 calls)−(882 calls)=118 calls (row 1124, column 1112 entry).

Figure 12:
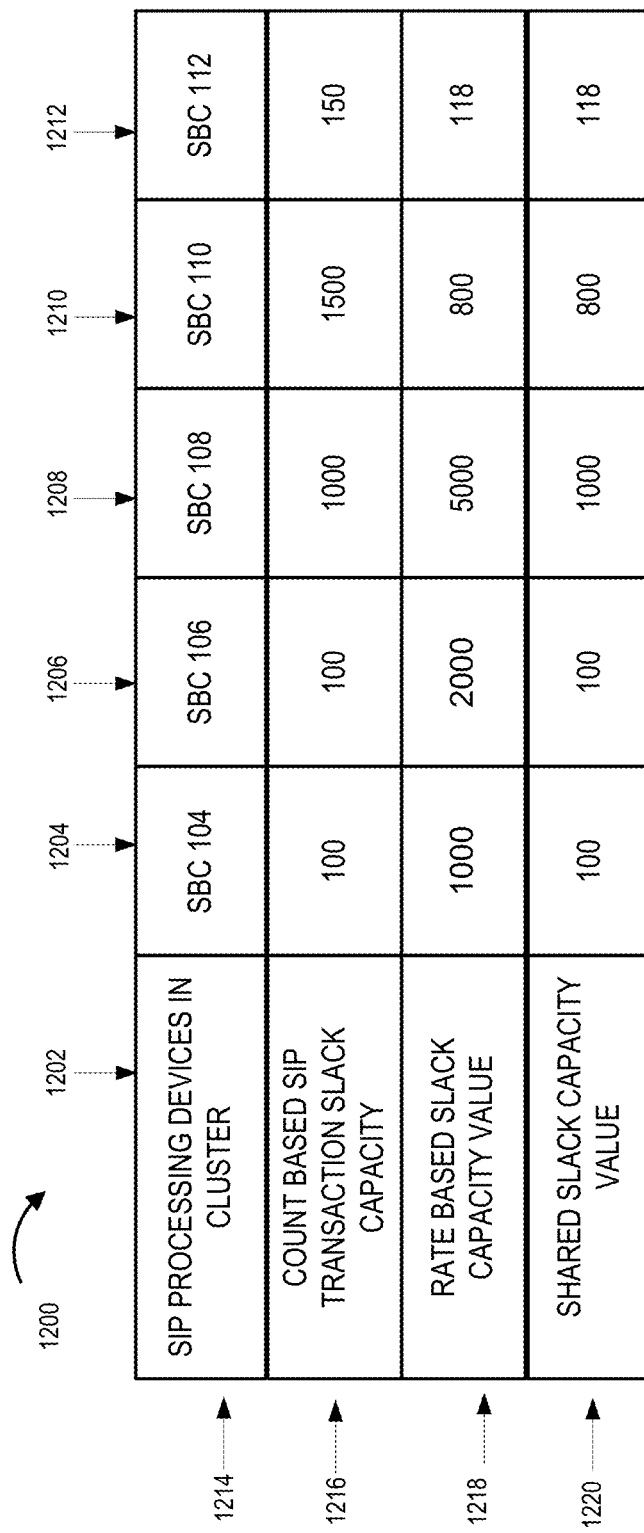
FIG. 12 illustrates an exemplary table of SIP processing device related information included shared slack capacity values.

Table 1200 of FIG. 12 illustrates the determination and/or selection of shared slack based capacity for SIP processing devices of a cluster based on each individual SIP processing device's count based SIP transaction slack capacity and rate based slack capacity value. In the example of FIG. 12, the SIP processing devices are the session border controllers 104, 106, 108, 110, and 112 of the cluster of session border controllers 102 of exemplary system 100 of FIG. 1 with the count based SIP transaction slack capacity values illustrated in FIG. 10 and the rate based slack capacity values illustrated in FIG. 11.

The entries for column 1202 of the table are labels or identifiers which are provided for explanatory purposes. These entries identify the information contained in each of the rows. Each of the columns in the table 1200 contains information relating to a specific SIP processing device in the cluster as stated in table entry (column 1202, row 1214). The entry (column 1202, row 1214) states "SIP processing devices in cluster," as the entries in row 1214 specify a SIP processing device from a cluster. The information contained in column 1204 is for SBC 104, the information contain in column 1206 is for SBC 106, the information contained in column 1208 is for SBC 108, the information contained in column 1210 is for SBC 110, and the information contained in column 1212 is for SBC 112.

The entries in row 1216 contain the count based SIP transaction slack capacity value. These values correspond to the values illustrated in row 1020 of Table 10. In this example the values represent call transactions. The entries in row 1218 contain the rate based slack capacity value expressed as call transactions. These values correspond to the values illustrated in row 1124 of Table 11. The entries in row 1222 contain the shared slack capacity value for the SIP processing device which in this example is expressed as number of call transactions. The shared slack value is determined by selecting the minimum value of the SIP processing device's count based SIP transaction slack capacity value and the rate based slack capacity value. If the two values are equal then that value becomes the shared slack capacity value.

The shared slack value for SBC 104 is min(100, 1000) =100 (row 1222, column 1204 entry). The shared slack value for the SBC 106 is min(100, 2000)=100 (row 1222, 1206 entry). The shared slack value for the SBC 108 is min(1000, 5000)=1000 (row 1222, 1208 entry). The shared slack value for the SBC 110 is min(1500, 800)=800 (row 1222, 1210 entry). The shared slack value for the SBC 112 is min(150, 118)=118 (row 1222, 1212 entry).

Figures 9, 9A:
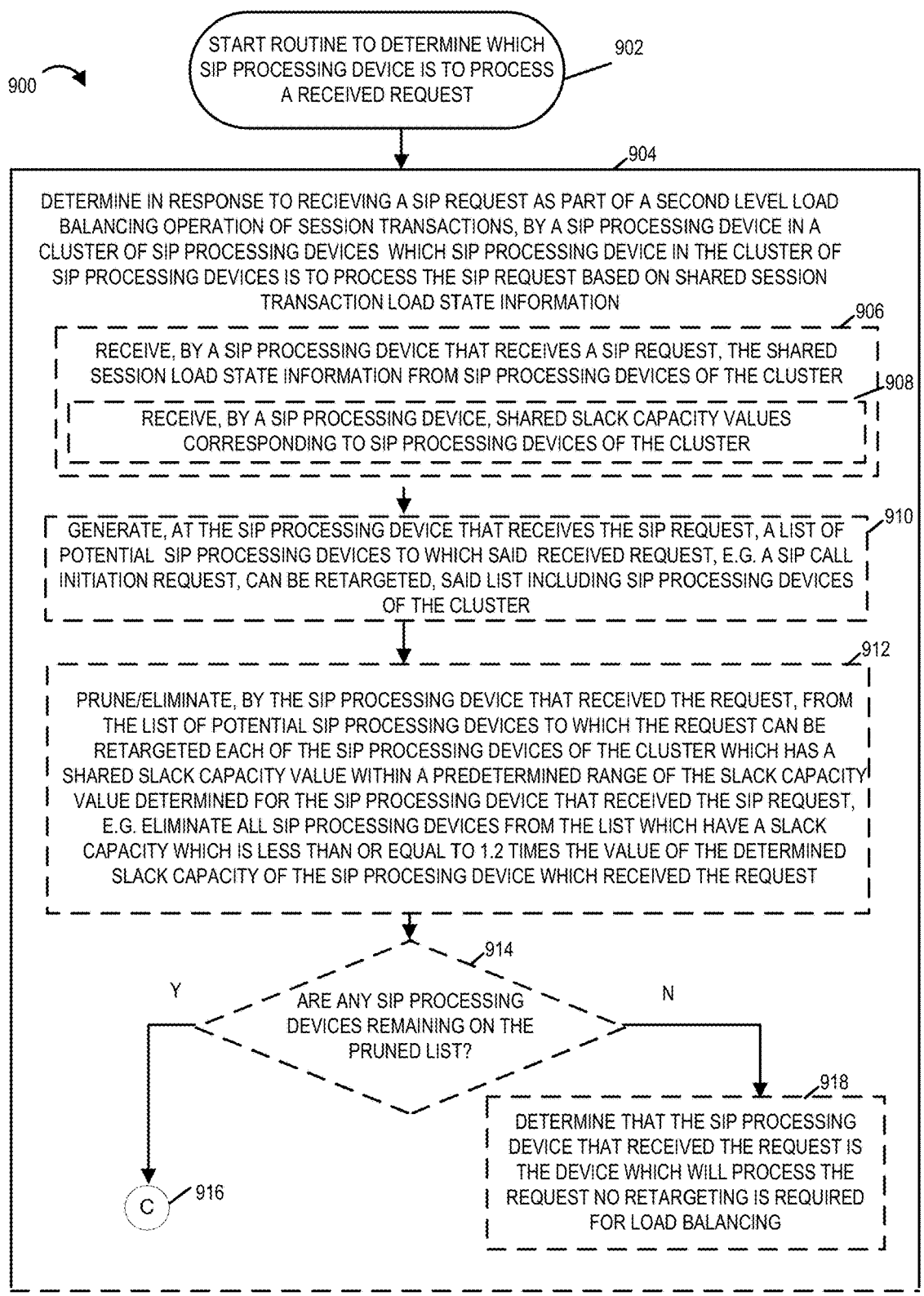
FIG. 9 illustrates the combination of FIGS. 9A and 9B.
FIG. 9A illustrates a first part of a method/routine for determining which SIP processing device in a cluster of SIP processing devices should process the SIP request as part of a SIP transaction load balancing operation in accordance with an embodiment of the present invention.
Figure 9B:
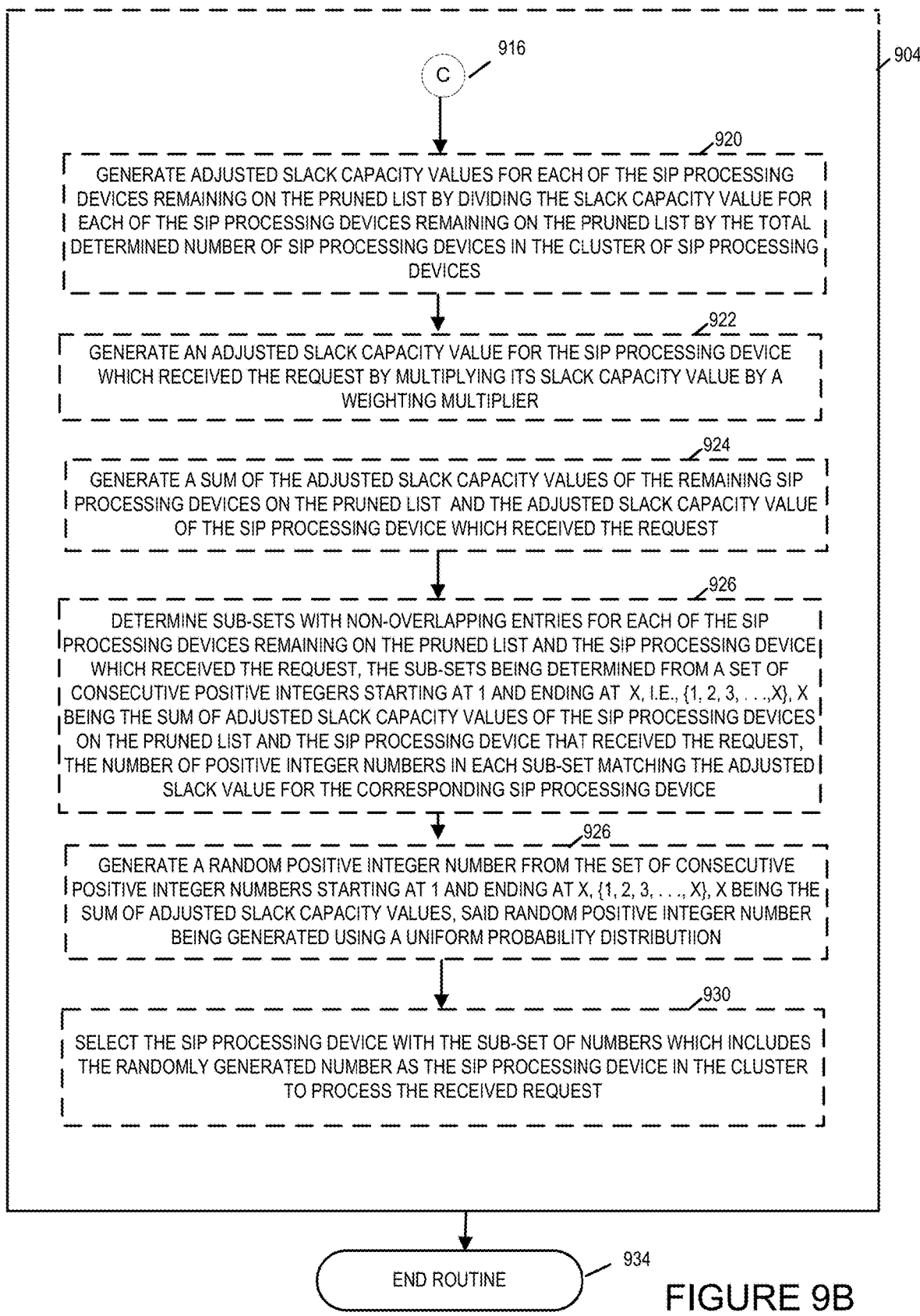
FIG. 9B illustrates a second part of a method/routine for determining which SIP processing device in a cluster of SIP processing devices should process the SIP request as part of a SIP transaction load balancing operation in accordance with an embodiment of the present invention.

An exemplary SIP request retargeting selection method/routine 900 illustrated in accordance with an exemplary embodiment will now be discussed. FIG. 9 comprises FIGS. 9A and 9B. FIG. 9A illustrates a first part of a method/routine 900 for determining which SIP processing device in a cluster of SIP processing devices should process the SIP request as part of a SIP transaction load balancing operation. FIG. 9B illustrates a second part of a method/routine 900 for determining which SIP processing device in a cluster of SIP processing devices should process the SIP request as part of a SIP transaction load balancing operation. The method/routine is implemented by a SIP processing device upon receipt of a SIP request such as a SIP INVITE or SIP REGISTER request. The SIP processing devices of the cluster may be, and in some embodiments are, Session Border Controllers. In some embodiments the SIP processing devices are SIP proxy devices or SIP application servers. The method/routine 900 uses a weighted probabilistic distribution in selecting the SIP processing device. As one of skill in the art will appreciate, the weighted probabilistic distribution provided in method/routine 900 is only exemplary in nature and other weighted probabilistic distributions may be used and are to be considered within the scope of the invention.

The method/routine 900 begins in start step 902 illustrated on FIG. 9A. Operation proceeds from step 902 to step 904. In step 904, a SIP processing device of a cluster of SIP processing devices, e.g., a SBC of a cluster of SBCs, determines in response to receiving a SIP request, e.g., SIP INVITE, as part of a second level load balancing operation of session transactions, which SIP processing device in the cluster of SIP processing devices is to process the SIP request based on shared session transaction load state information. In some embodiments, step 904 includes one or more sub-steps 906, 908, 912, 914, 918, 920, 922, 924, 926, 928, 930, and 932. These sub-steps are implemented by the SIP processing device in the cluster which receives the SIP request.

In sub-step 906, a SIP processing device that receives a SIP request, receives shared session load state information from SIP processing devices of the cluster. This shared session load state information may be received prior to the receipt of the SIP request. In some embodiments, sub-step 906 includes sub-step 908. In sub-step 908, a SIP processing device receives shared slack capacity values corresponding to SIP processing devices of the cluster. Operation proceeds from sub-step 906 to sub-step 910.

In sub-step 910, a list of potential SIP processing devices to which the SIP received request, e.g., a SIP call initiation request, can be retargeted is generated. The SIP processing devices include the SIP processing devices in the cluster of SIP processing devices. The list of potential SIP processing devices to which a received request can be retargeted may be, and typically is, based on the received shared session load state information. For example, SIP processing devices of the cluster from which shared session load state information is received are included on the list and SIP processing devices of the cluster from which shared session load state information is not received are not included on the list. In some such embodiments only a subset of the SIP processing devices of which the cluster is comprised may be included on the list of potential SIP processing devices to which a received request can be retargeted for example when shared session load state information is only received from a subset of the SIP processing devices of which the cluster is comprised. In some embodiments, if the shared session load state information received from a SIP processing device is considered stale or out of date the corresponding SIP processing device may be excluded from the list of potential SIP processing devices to which a received request can be retargeted. Operation proceeds from sub-step 910 to sub-step 912.

In sub-step 912, the SIP processing device that received the request, prunes or eliminates from the list of potential SIP processing devices to which the request can be retargeted each of the SIP processing devices of the cluster which has a shared slack capacity value within a predetermined range of the slack capacity value determined for the SIP processing device that received the SIP request. For example, the SIP processing device that received the request may eliminate or prune all of the SIP processing devices from the list which have a shared slack capacity value which is less than or equal to 1.2 times the value of the determined shared slack capacity of the SIP processing device which received the request. Operation proceeds from sub-step 912 to sub-step 914 which is a decision step.

In sub-step 914 a determination is made as to whether there are any SIP processing devices remaining on the pruned list of potential SIP processing devices to which the request can be retargeted. If the answer is no then operation proceeds from sub-step 914 to sub-step 918. In sub-step 918 a determination is made that the SIP processing device that received the request is the device which will process the request and that no retargeting is required for load balancing.

If the answer in sub-step 914 is yes that there are still SIP processing devices remaining on the pruned list of potential SIP processing devices to which the received request can be retargeted then operation proceeds from sub-step 914 to sub-step 920 shown on FIG. 9B via connection node B 916.

In sub-step 920, the slack capacity value for each of the SIP processing devices remaining on the pruned list is divided by the total determined number of SIP processing devices in the cluster of SIP processing devices to generate adjusted slack capacity values for the SIP processing devices remaining on the pruned list. Operation proceeds from sub-step 920 to sub-step 922.

In sub-step 922, the slack capacity value for the SIP processing device that received the request is adjusted using a weighting multiplier. This slack capacity value for the SIP processing device that received the request may be a shared slack capacity value previously generated and shared or a slack capacity value generated but not shared, for example generated in response to the received request but not shared with the other SIP processing devices of the cluster. The weighting multiplier value is a positive fractional number selected to be less than the value 1, for example 0.9, when the slack capacity is to be adjusted down so that it is has a lower probability of being chosen as the SIP processing device which will be selected to process the received request. The weighting multiplier value is selected to be a positive number greater than the value 1, for example 1.3, when the slack capacity value is to be adjusted up so that it has a higher probability of being chosen as the SIP processing device which will be selected to handle/process the received request. A weighting multiplier value of 1 is used when the slack capacity value for the SIP processing device that received the request is not to be adjusted. In such instances, the adjusted slack capacity value and the original slack capacity value are the same. As one of skill in the art will appreciate the smaller the fractional value of the multiplier the lower the probability of being chosen and the greater the value of the multiplier above 1 the higher the probability of being chosen as the device selected to handle/process the request. In some embodiments, when the SIP processing device is not to have its slack capacity value adjusted sub-step 922 is bypassed and the slack capacity value for the SIP processing device is used in subsequent sub-steps of the routine as the adjusted slack capacity value. In some embodiments, the weighting multiplier is configurable. In some embodiments, the weighting multiplier is a dynamically changing value that is based on a policy or rule received by the SIP processing device. For example, the rule may be to dynamically generate the weighting multiplier for each request received based on the slack capacity of the SIP processing device that received the request so that when the slack capacity equals or falls below a first threshold value the multiplier value is decreased and when the slack capacity equals or becomes greater than a second threshold value the multiplier value is increased. The first and second multiplier values may be the same or different. Different first and second threshold values may be, and sometimes are, used to prevent excessive changing of the multiplier value when the SIP processing device has a slack capacity operating at or near the threshold value. Operation proceeds from sub-step 922 to sub-step 924.

In sub-step 924, a sum of the adjusted slack capacity values of the remaining SIP processing devices on the pruned list (i.e., the divided slack capacity values of the remaining SIP processing devices on the pruned list) and the adjusted slack capacity value of the SIP processing device which received the request is generated. Operation proceeds from sub-step 924 to sub-step 926.

In sub-step 926, a sub-set of non-overlapping positive integer numbers is determined for each of the SIP processing devices remaining on the pruned list and the SIP processing device which received the request from a set of consecutive positive integers starting at 1 and ending at X, X being the sum of the adjusted slack values generated in sub-step 924, i.e., the set of {1, 2, 3, . . . , X}, X=sum of adjusted slack values. The number of positive integer numbers included in each sub-set matching the adjusted slack value for the corresponding SIP processing device. For example, see row 1324 of table 1300 of FIG. 13A which shows that the SBC 104 which has an adjusted slack capacity of 130 has a sub-set of positive integer numbers from 1 to 130, i.e., {1, 2, 3, . . . , 130}, the SBC 108 which has an adjusted slack capacity value of 200 has a sub-set of positive integer numbers from 131 to 330, i.e., {131, 132, 133, . . . , 330}, and the SBC 110 which has an adjusted slack capacity of 160 has a sub-set of positive integer numbers from 331 to 490, i.e., {331, 332, 333, . . . , 490}. The sum of the adjusted slack capacities of the SIP processing devices being 490. Operation proceeds from sub-step 926 to sub-step 928.

In sub-step 928, a random positive integer number is generated from a set of positive integers from 1 to the sum of the adjusted slack capacity values determined in sub-step 924 using a uniform distribution, that is, any number in the set has an equal probability of being generated. For example, generating a random positive number from the set of {1, 2, 3, . . . , 490} with each number in the set having an equal probability of being generated. Using the example shown in FIG. 13A, the random number generated is 227 and the selected SIP processing device is SBC 108 whose sub-set of numbers includes the number 227. Operation proceeds from sub-step 928 to sub-step 930.

Figure 13A:
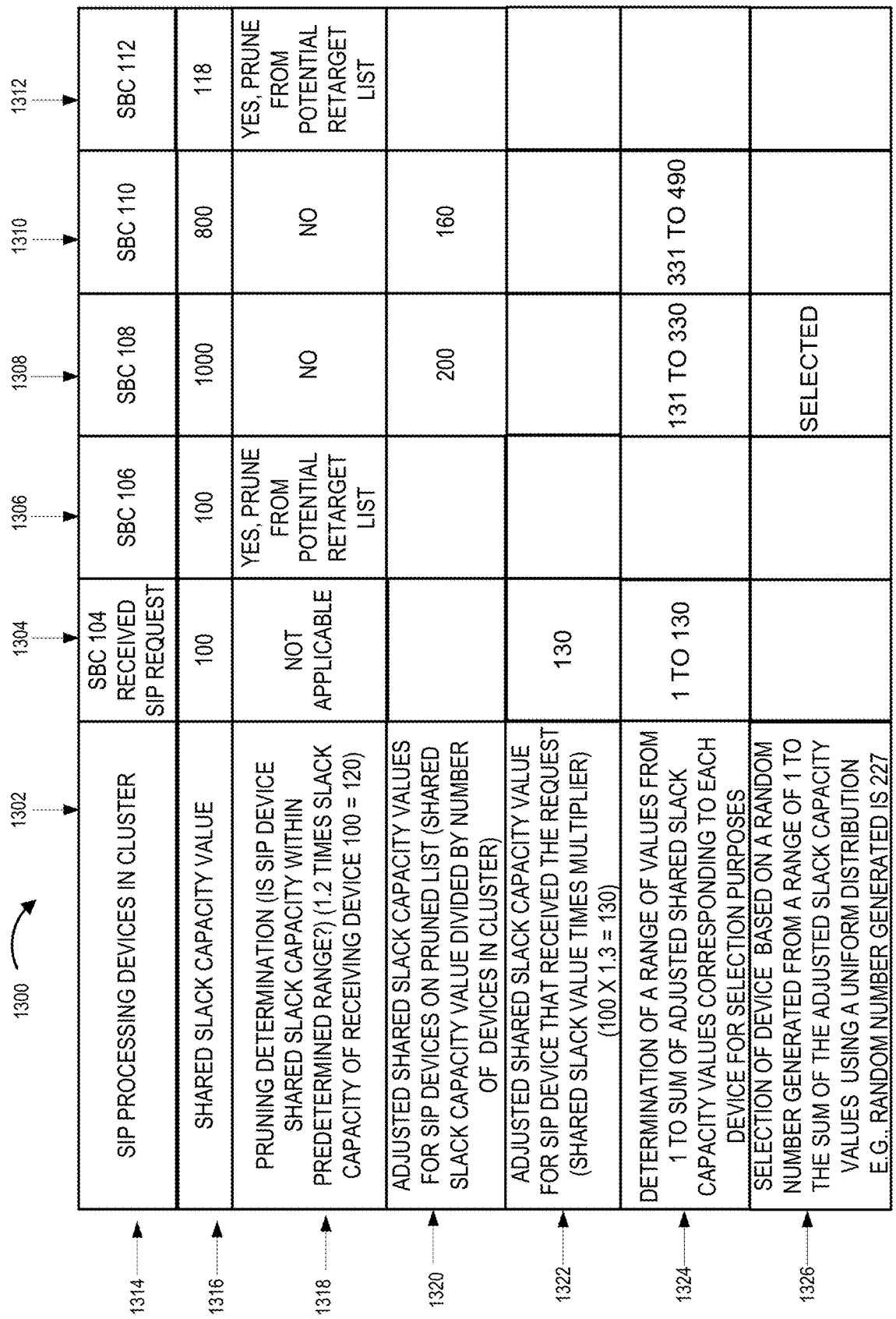
FIG. 13A illustrates an exemplary table of SIP processing device related information pertaining to device selection through load balancing techniques in accordance with an exemplary embodiment of the present invention.

In sub-step 930, the SIP processing device with the sub-set of positive integer numbers including the random generated number is selected as the SIP processing device that will process/handle the request. When the SIP processing device that is selected to process the request is a SIP processing device on the pruned list, the selected SIP processing device becomes the SIP processing device to which the request will be retargeted. When the SIP processing device that is selected is the SIP processing device that received the request, then the SIP processing device will retain the received request for processing and no retargeting will be performed. In the example of FIG. 13A, the random number generated was 227. SBC 108 is the selected device to process the request as its corresponding sub-set of positive integers includes the positive consecutive integers in the range of 131 to 330 which includes 227. As the SBC 108 is a SIP processing device on the pruned list it becomes the selected SIP processing device to which the request will be retargeted in this example. If the random number generated had been in the range of 331 to 460 the SBC 110 would be selected as the SIP processing device to process/handle the request and to which the request would be retargeted. If the random number generated had been in the range of 1 to 130, then the SBC 104 which is the SIP processing device that received the request would be selected as the SIP processing device to process the request and the request would not be retargeted but would be retained by SBC 104 for processing.

Operation proceeds from step 904 to step 934 which is the end of the method/routine. The method/routine 900 is performed each time a decision is needed as to whether retargeting of a request is necessary. In many embodiments, the method/routine 900 is performed for each SIP request received by a SIP processing device in the cluster of SIP processing devices.

Table 1300 of FIG. 13A illustrates exemplary values used and generated during a selection process in accordance with the method/routine 900 of FIG. 9. The example of FIG. 13A builds on the shared slack capacity values generated in connection with table 1200 of FIG. 12. In this example, the transactions are calls. In the example of FIG. 13A, the SIP processing devices are the session border controllers 104, 106, 108, 110, and 112 of the cluster of session border controllers 102 of exemplary system 100 of FIG. 1.

The entries for column 1302 of the table are labels or identifiers which are provided for explanatory purposes. These entries identify the information contained in each of the rows. Each of the columns in the table 1300 contains information relating to a specific SIP processing device in the cluster as stated in table entry (column 1302, row 1314). The entry (column 1302, row 1314) states "SIP processing devices in cluster," as the entries in row 1314 specify a SIP processing device from a cluster. The information contained in column 1304 is for SBC 104 which in this example is the SIP processing device which received the SIP request, the information contained in column 1306 is for SBC 106, the information contained in column 1308 is for SBC 108, the information contained in column 1310 is for SBC 110, and the information contained in column 1312 is for SBC 112. The SBC 104 which received the request in this example is the SBC which will be performing the various steps of the method/routine 900.

Row 1316 includes shared slack capacity values for the SBC devices of the cluster which are the shared slack capacity values contained in row 1222 of FIG. 12. It should be noted that the shared slack capacity value of SBC 104 may be generated by SBC 104 and not necessarily shared with the other SBCs of the cluster. For example, the SBC 104 may, and in some embodiments does, generate its slack capacity value after receipt of the SIP request. In some other embodiments, the SBC 104 uses the shared slack capacity it last generated and shared with SBCs of the cluster of SBCs.

The SBC 104 has a slack capacity value 100 (row 1316 column 1304 entry); SBC 106 has a shared slack capacity value of 100 (row 1316, column 1306 entry); SBC 108 has a shared slack capacity value of 1000 (row 1316, column 1308 entry); SBC 110 has a shared slack capacity value of 800 (row 1316, column 1310 entry); and SBC 112 has a shared slack capacity value of 118. The slack capacity values can be expressed as number of transactions where the transactions are calls.

The list of potential SIP processing devices to which the received request can be sent is SBC 106, SBC 108, SBC 110 and SBC 112.

Row 1318 contains the pruning determination with respect to the list of the potential SBCs to which the request can be retargeted. If a SIP processing device has a shared slack capacity within a predetermined range of the SIP processing device that received the request, it is pruned from the list of potential retargeting candidates. In this example the predetermined range is 1.2 times the slack capacity of the receiving SBC 104's slack capacity value which was 100, (100)(1.2)=120. SBC 106 has a shared slack capacity of 100 which is less than 120 so it is within the predetermined range and is pruned from the potential retarget list (row 1318, column 1306 entry). SBC 108 has a shared slack capacity of 1000 which is greater than 120 and therefore is outside the predetermined range. SBC 108 is not pruned from the potential retarget list (row 1318, column 1308 entry). SBC 110 has a shared slack capacity of 800 which is greater than 120 and therefore is outside the predetermined range. SBC 110 is not pruned from the potential retarget list (row 1318, column 1310 entry). SBC 112 has a shared slack capacity of 118 which is less than 120 and therefore falls within the predetermined range. SBC 112 is pruned from the potential retarget list (row 1318, column 1310 entry).

Row 1320 contains the adjusted shared slack capacity values for the SBCs remaining on the pruned potential retarget list. The adjusted shared slack capacity values are generated by dividing the shared slack capacity values by the number of SIP processing devices in the cluster. There are five SBCs in the cluster (SBC 104, SBC 106, SBC 108, SBC 110 and SBC 112). SBC 108 has an adjusted shared slack capacity value of one thousand (1000) divided by five (5) which equals 200 (row 1320, column 1308 entry). SBC 1310 has an adjusted shared slack capacity value of eight hundred (800) divided by five (5) which equals 160 (row 1320, column 1310 entry).

Row 1322 contains the adjusted slack capacity value for the SIP processing device that received the request which in this example is SBC 104. The adjusted slack capacity for SBC 104 is adjusted through the use of a weighting multiplier. In this example, the weighting multiplier is 1.3. The adjusted slack capacity for SBC 104 is the shared slack capacity for SBC 104 which is one hundred (100) times the weighting multiplier which is 1.3 which equals 130 (row 1322, column 1304 entry).

Row 1324 contains the sub-set of positive integer numbers corresponding to the pruned list of potential re-targeting SIP processing devices and the SIP processing device that received the request. In this example, the sum of the adjusted slack capacity values is 490 which is the sum of the SBC 104 adjusted slack capacity of 130+the SBC 108 adjusted slack capacity of 200+the SBC 110 adjusted slack capacity 160. The set of positive integer numbers from which the sub-sets corresponding to SBC 104, 108 and 110 will be generated is 1 to 490, i.e., {1, 2, 3, . . . , 490}. SBC 104 has an adjusted slack capacity of 130 and has a sub-set of positive integers consisting of the integers in the range of 1 to 130, i.e., {1, 2, 3, . . . , 130} (row 1324, column 1304 entry). SBC 108 has an adjusted slack capacity of 200 and has a sub-set of positive integers consisting of the integers in the range of 131 to 330, i.e., {131, 132, 133, . . . , 330} (row 1324, column 1308 entry). SBC 110 has an adjusted slack capacity of 160 and has a sub-set of positive integers consisting of the integers in the range of 331 to 490, i.e., {331, 332, 333, . . . , 490} (row 1324, column 1310 entry). It will be noted that the sub-set of integers do not contain overlapping entries and the number of integers in each sub-set corresponds to the adjusted slack value for the device to which the sub-set corresponds.

Row 1326 contains the selection of the SIP processing device that will handle/process the SIP request based on a random number generated using a uniform distribution from the set of positive integer numbers from the range of 1 to the sum of the adjusted slack capacity values, i.e., {1, 2, 3, . . . , 490}. The use of a uniform distribution means that each positive number in the set has an equal probability of being generated. In this example, the random number generated is 227 (row 1326, column 1302 entry). As SBC 108's corresponding sub-set of positive integers, {131, 132, . . . , 330} includes the number 227, SBC 108 is the selected SIP processing device (row 1326, column 1308 entry).

Figure 13B:
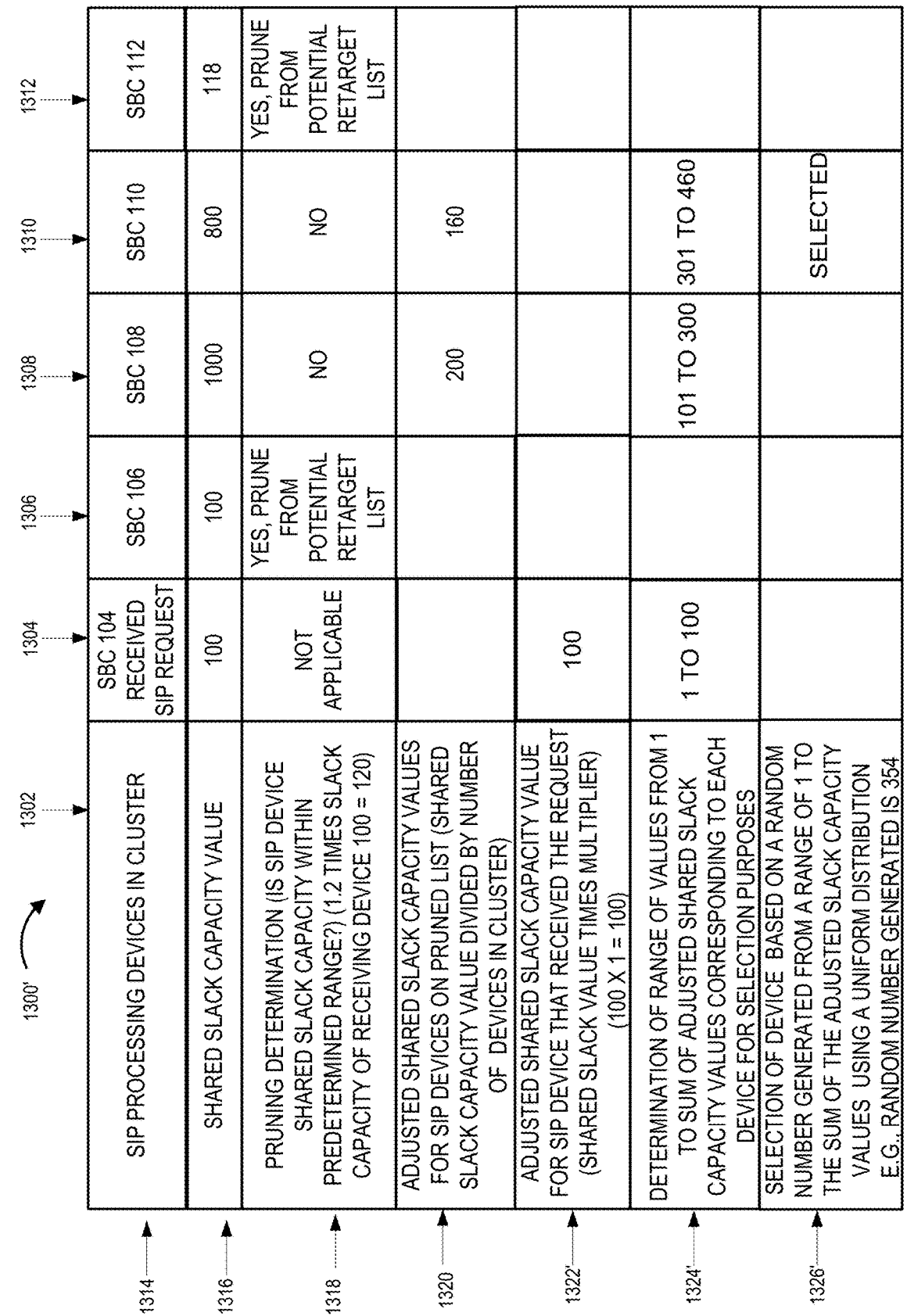
FIG. 13B illustrates an exemplary table of SIP processing device related information pertaining to device selection through load balancing techniques in accordance with another exemplary embodiment of the present invention.

Table 1300' of FIG. 13B illustrates another set of exemplary values used and generated during a selection process in accordance with the method/routine 900 of FIG. 9. Table 1300' of FIG. 13B is similar to table 1300 of FIG. 13A with rows 1314, 1316, 1318, and 1320 being the same. In the example shown in FIG. 13B, a decision has been made that the adjusted slack capacity for the processing device which received the request, SBC 104, should remain the same its original slack capacity value. In the embodiment shown, row 1322' of table 1300' shows the adjusted shared slack capacity value for the SIP processing device that received the request is computed by multiplying the shared slack value of SBC 104 which is 100 by the weighting multiplier of one (row 1322', column 1302 entry). The result is an adjusted slack capacity value of 100 (row 1322', column 1304 entry) which is the same as the original shared slack capacity for SBC 104 (row 1316, column 1304 entry). In some embodiments, this computation is not performed and the associated sub-step 922 is bypassed with operation of the method going from sub-step 920 to sub-step 924.

Row 1324' of table 1300' shows the determination of the range of values from 1 to the sum of the adjusted shared slack capacity values corresponding to each device for selection purposes. The sub-set of positive consecutive integers from 1 to 100, i.e., {1, 2, 3, . . . , 100} (row 1324', column 1304 entry) is shown as corresponding to SBC 104. The sub-set of positive consecutive integers from 101 to 300, i.e., {101, 102, 103, . . . , 300} (row 1324', column 1308 entry) is shown as corresponding to SBC 108. The sub-set of positive consecutive integers from 301 to 460, i.e., {301, 302, . . . , 460} (row 1324', column 1310 entry) is shown as corresponding to SBC 110. The sum of the adjusted slack capacity values is 100+200+160=460. The set of positive consecutive integer numbers from which the sub-sets have been determined is 1 to 460, i.e., {1, 2, 3, . . . , 460}.

Row 1326' contains the selection of the SIP processing device that will handle/process the SIP request based on a random number generated using a uniform distribution from the set of positive integer numbers from the range of 1 to the sum of the adjusted slack capacity values, i.e., {1, 2, 3, . . . , 460}. In this example, the random number generated is 354 (row 1326', column 1302 entry). As SBC 110's corresponding sub-set of positive integers, {301, 302, . . . , 460}, includes the number 354, SBC 110 is the selected SIP processing device (row 1326', column 1310 entry).

It should be understood that the values used in FIGS. 10, 11, 12, 13A and 13B have been selected for ease of explanation in explaining the invention and are not meant to reflect actual or typical values.

It will be appreciated that while in the above example slack capacity in the SIP processing devices of the cluster has been shared and used for load balancing, instead of using the SIP processing device's slack capacity the SIP processing device resource utilization which is the equivalent mirror of the slack capacity may be used.

As one of skill in the art will appreciate, the present invention is also applicable to cloud computing environments such as those wherein SBC services are provided by a cluster of virtual SBC instantiated on compute nodes. FIG. 1400 illustrates a private cloud with multiple virtual session border controllers which may be, and in some embodiments are, implemented accordance with an embodiment of the present invention.

The above embodiments provide a SIP, standards-compliant, cloud-ready application that achieves SIP load rebalancing by sharing state information among a group of SBCs with the individual SBCs of the group rebalancing load based on that state information. Among the advantages of the various embodiments of the present invention are: (1) multiple types of initial (first level) load balancing are supported, including very simplistic methods that are easy to implement and require trivial coupling with the SBC service; (2) variants can support common use cases, including access behind symmetric NAPTs and encrypted transports, at high scale and performance; (3) requires zero proprietary change on the parts of peers and allowing for implementation in current networks; (4) good load balancing is achieved across a variety of situations including disproportionate load across different call flows, dynamic addition of SBCs to a cluster, bad distribution of load by peers (devices sending requests to the SBCs of the cluster) or first stage balancing, and a variety of additional conditions which can cause hot-spotting within a cluster; (5) highly scalable and, in fact, performs better as the number of SBCs in the cluster increases.

Various additional features of the present invention will now be described in connection with exemplary method embodiments. The method embodiments are only exemplary in nature and the features may be used in any number of combinations.

A method embodiment 1 of load balancing Session Initiation Protocol session transactions among a self-organized cluster of Session Initiation Protocol (SIP) processing devices, the method comprising: dynamically forming a load balancing cluster of SIP processing devices from a plurality of SIP processing devices, said cluster of SIP processing devices being self-organized; dynamically building a communications network, by said cluster of SIP processing devices, for distributing session transaction load state information among the SIP processing devices in the cluster; and each of the SIP processing devices of the cluster asynchronously determining session transaction load state information on a recurring basis reflecting its current session transaction load state.

A method embodiment 1A, the method including the method embodiment 1 wherein said SIP processing devices are session border controllers, SIP proxy devices, or SIP application servers.

A method embodiment 1B, the method including the method embodiment 1 wherein the communications network is a non-partitioned network.

A method embodiment 1BB, the method including the method embodiment 1B wherein the communications network is a mesh network.

A method embodiment 1BC, the method including the method embodiment 1 wherein the communications network is a partial or full mesh network.

A method embodiment 2, the method including the method embodiment 1 and further comprising: a set of individual SIP processing devices of the cluster of SIP processing devices asynchronously sharing on a recurring basis generated session transaction load state information with one or more SIP processing devices of the cluster.

A method embodiment 2A, the method including the method embodiment 2 wherein said set of individual SIP processing devices of the cluster includes less than all of said SIP processing devices in said cluster.

A method embodiment 2B, the method of method embodiment 2 wherein said individual SIP processing devices of the cluster includes all of the SIP processing devices in said cluster.

A method embodiment 2C, the method of method embodiment 2 wherein said one or more SIP processing devices includes all SIP processing devices in the cluster.

A method embodiment 2D, the method of method embodiment 2 wherein a first SIP processing device from the SIP processing devices in said cluster receives session transaction load state information from a second SIP processing device of the cluster and transmits that session transaction load state information to a third SIP processing device of the cluster.

A method embodiment 3, the method of method embodiment 2 further comprising: performing a first level load balancing session transactions among said cluster of SIP processing devices.

A method embodiment 4, the method of method embodiment 3 wherein said first level load balancing is performed without knowledge of the session transaction load state information for the SIP processing devices of the cluster.

A method embodiment 4A, the method of method embodiment 4 wherein said first level load balancing is performed by a front end load balancing device, a peer device using Domain Name System (DNS) based distribution, or round-robining among multiple routes.

A method embodiment 5, the method of method embodiment 3 further comprising: performing, by the SIP processing devices of the cluster, a second level load balancing of said session transactions using said shared session transaction load state information, said second level load balancing including individual SIP processing devices upon receipt of a session transaction initiation request probabilistically retargeting said session transaction initiation request based on knowledge of the load of peer SIP processing devices of the cluster determined from said shared session transaction load state information.

A method embodiment 6, the method of method embodiment 1 wherein the session transaction load state information for a SIP processing device corresponds to at least one of a slack capacity of the SIP processing device or a portion of the SIP processing resources being utilized of the total SIP processing resources available for utilization of the SIP processing device.

A method embodiment 7, the method of method embodiment 6 wherein the session transaction load state information for a SIP processing device corresponds to said slack capacity, said slack capacity corresponding to a session transaction capacity.

A method embodiment 8, the method of method embodiment 6 wherein the session transaction load state information for a SIP processing device corresponds to said slack capacity, said slack capacity including at least one of a call capacity or a session registration capacity.

A method embodiment 9, the method of method embodiment 6 wherein said slack capacity is normalized.

A method embodiment 10, the method of method embodiment 6 wherein the slack capacity is determined based on two dimensions, the first dimension being a count-based slack capacity and the second dimension being a rate based slack capacity.

A method embodiment 10A, the method of method embodiment 10 wherein the count-based slack capacity is the difference between current active calls and maximum calls and the rate-based slack capacity is the difference between current call rate and the maximum call rate capability.

A method embodiment 10B, the method of method embodiment 10 wherein the count-based slack capacity is the difference between current active registrations and maximum registrations and the rate-based slack capacity is the difference between current registration arrival rate and the maximum registration rate capability.

A method embodiment 10C, the method of method of method embodiment 10 wherein the slack capacity shared by a SIP processing device is a minimum of the count-based slack capacity and the rate based slack capacity.

A method embodiment 11, the method of method embodiment 5 wherein said retargeting includes responding to a SIP request with a SIP 3XX redirection message or relaying the SIP request to a selected target SIP processing device, said selected target SIP processing device being another SIP processing device in said cluster of SIP processing devices.

A method embodiment 11A, the method of method embodiment 11 wherein said SIP request is a SIP Invite request or a SIP Registration request.

A method embodiment 12, the method of method embodiment 5 wherein said retargeting includes responding to a SIP request received at a first SIP processing device from the cluster of SIP processing devices with a SIP response including a contact address for a second SIP processing device from the cluster of SIP processing devices.

A method embodiment 12A, the method of method embodiment 5 wherein said SIP request is a SIP Invite or SIP Registration request.

A method embodiment 12B, the method of method embodiment 5 further including determining by a first SIP processing device as part of a second level load balancing determination that a received SIP request should be sent to another SIP processing device in the cluster of SIP processing devices based on the session transaction load state information of the SIP processing devices in the cluster.

A method embodiment 13, the method of method embodiment 12 further including determining by the first SIP processing device as part of a second level load balancing determination that the received SIP request should be sent to another SIP processing device in the cluster of SIP processing devices based on the session transaction load state information of the SIP processing devices in the cluster.

A method embodiment 13A, the method of method embodiment 13 wherein said retargeting does not include sending a 3XX in response to said SIP request.

A method embodiment 13B, the method of method embodiment 13 wherein said first SIP processing device is operated as a SIP proxy, operating as a SIP proxy including relaying the SIP request to a selected target SIP processing device, said selected target SIP processing device being another SIP processing device in said cluster of SIP processing devices determined through a second level load balancing operation performed by said first SIP processing device.

A method embodiment 14, the method of method embodiment 3 further including performing second level load balancing of said transactions, said second level load balancing including individual SIP processing devices of the cluster upon receipt of a session transaction initiation request making a retargeting determination based on the session transaction load state information of the SIP processing devices in the cluster and determining whether to retarget or retain said received session transaction initiation request for processing.

A method embodiment 15, the method of any of the proceeding embodiments 1, 2, 3, 4, 5, 6, 7, 8, 9, 10, 11, 12, 13 or 14 wherein the SIP processing devices of the cluster of SIP processing devices are configured to operate in compliance with Internet Engineering Task Force (IETF) Request For Comments (RFC) 3261 and RFC 3263 standards.

Various additional features of the present invention will now be described in connection with exemplary apparatus/system embodiments. As explained above in connection with the exemplary method embodiments, the apparatus/system embodiments are only exemplary in nature and the features may be used in any number of combinations.

A communications system embodiment 1 for load balancing Session Initiation Protocol session transactions among a self-organized cluster of Session Initiation Protocol (SIP) processing devices, the system comprising: a plurality of self-organizing SIP processing devices configured to dynamically form a load balancing cluster of SIP processing devices; a communications network coupling the SIP processing devices of the cluster together for distributing session transaction load state information among the SIP processing devices in the cluster, and wherein each of the SIP processing devices of the cluster includes a processor configured to independently and asynchronously control the SIP processing device in which the processor is included to generate session transaction load state information on a recurring basis reflecting its current session transaction load state.

A communications system embodiment 1A, the communications system embodiment 1 wherein said Session Initiation Processing devices are session border controllers, SIP proxy devices or SIP application servers.

A communications system embodiment 1B, the communications system embodiment 1 wherein the communications network is a non-partitioned network.

A communication system embodiment 1BB, the communications system embodiment 1B wherein the communications network is a mesh network.

A communication system embodiment 1BC, the communications system embodiment 1 wherein the communications network is a partial or full mesh network.

A communications system embodiment 2, the communications system embodiment 1 wherein: a set of individual SIP processing devices of the cluster of SIP processing devices have their corresponding processor further configured to control the SIP processing device in which the processor is included to share on a recurring basis said generated session transaction load state information with one or more SIP processing devices of the cluster.

A communication system embodiment 2A, the communications system embodiment 2 wherein said set of individual SIP processing devices of the cluster includes less than all of said SIP processing devices in said cluster.

A communications system embodiment 2B, the communications system of embodiment 2 wherein said individual SIP processing devices of the cluster includes all of the SIP processing devices in said cluster.

A communication system embodiment 2C, the communications system embodiment 2 wherein said one or more SIP processing devices includes all SIP processing devices in the cluster.

A communications system embodiment 2D, the communications system embodiment 2 wherein a first SIP processing device from the SIP processing devices in said cluster includes: a receiver for receiving session transaction load state information from a second SIP processing device of the cluster; and a transmitter for transmitting that session transaction load state information to a third SIP processing device of the cluster.

A communications system embodiment 3, the communications system embodiment 2 further comprising: a front end loading balancing device including a processor configured to control the front end load balancing device to perform a first level load balancing of session transactions among said cluster of SIP processing devices.

A communications system embodiment 4, the communications system embodiment 3 wherein the processor of said front end load balancing device is further configured to control said front end load balancing device to perform said first level load balancing without knowledge of the session transaction load state information for the SIP processing devices of the cluster.

A communications system embodiment 5, the communications system embodiment 3 wherein each of the SIP processing devices of the cluster of SIP processing devices includes a receiver for receiving session transaction initiation requests; and wherein said processors included in each of the SIP processing devices of the cluster are configured to control the SIP processing devices of the cluster in which the processor is included to perform a second level load balancing of said session transactions using said shared session transaction load state information upon receipt of a session transaction initiation request, said second level load balancing including probabilistically retargeting said session transaction initiation request based on knowledge of the load of peer SIP processing devices of the cluster determined from said shared session transaction load state information.

A communications system embodiment 6, the communications system embodiment 1 wherein the session transaction load state information for a SIP processing device corresponds to at least one of a slack capacity of the SIP processing device or a portion of the SIP processing resources being utilized of the total SIP processing resources available for utilization of the SIP processing device.

A communications system embodiment 7, the communications system embodiment 6 wherein the session transaction load state information for a SIP processing device corresponds to said slack capacity, said slack capacity corresponding to a session transaction capacity.

A communications system embodiment 8, the communications system embodiment 6 wherein the session transaction load state information for a SIP processing device corresponds to said slack capacity, said slack capacity including at least one of a call capacity or a session registration capacity.

A communications system embodiment 9, the communications system embodiment 6 wherein said slack capacity is normalized.

A communications system embodiment 10, the communications system embodiment 6 wherein the slack capacity is determined based on two dimensions, the first dimension being a count-based slack capacity and the second dimension being a rate based slack capacity.

A communications system embodiment 10A, the communications system embodiment 10 wherein the count-based slack capacity is the difference between current active calls and maximum calls and the rate-based slack capacity is the difference between current call rate and the maximum call rate capability.

A communications system embodiment 10B, the communications system embodiment 10 wherein the count-based slack capacity is the difference between current active registrations and maximum registrations and the rate-based slack capacity is the difference between current registration arrival rate and the maximum registration rate capability.

A communications system embodiment 10C, the communications system embodiment 10 wherein the slack capacity shared by a SIP processing device is a minimum of the count-based slack capacity and the rate based slack capacity.

A communications system embodiment 11, the communications system embodiment 5 wherein said retargeting includes responding to a SIP request with a SIP 3XX redirection message or relaying the SIP request to a selected target SIP processing device, said selected target SIP processing device being another SIP processing device in said cluster of SIP processing devices.

A communications system embodiment 11A, the communications system embodiment 11 wherein said SIP request is a SIP Invite request or a SIP Registration request.

A communications system embodiment 12, the communications system embodiment 5 wherein said retargeting includes responding to a SIP request received at a first SIP processing device from the cluster of SIP processing devices with a SIP response including a contact address for a second SIP processing device from the cluster of SIP processing devices.

A communications system embodiment 12A, the communications system embodiment 5 wherein said SIP request is a SIP Invite or SIP Registration request.

A communications system embodiment 13, the communications system embodiment 12 wherein said processor included in said first SIP processing device is further configured to control said first SIP processing device to determine as part of the second level load balancing determination that the received SIP request should be sent to another SIP processing device in the cluster of SIP processing devices based on the session transaction load state information of the SIP processing devices in the cluster.

A communications system embodiment 13A, the communications system embodiment 13 wherein said retargeting does not include sending a 3XX in response to said SIP request.

A communications system embodiment 13B, the communications system embodiment 13 wherein said processor of the first SIP processing device is further configured to control said first SIP processing device to operate as a SIP proxy including relaying the SIP request to a selected target SIP processing device, said selected target SIP processing device being another SIP processing device in said cluster of SIP processing devices determined through said second level load balancing operation performed by said first SIP processing device.

A communications system embodiment 14, the communications system embodiment 3 wherein said processors included in said SIP processing devices of said cluster are further configured to control said SIP processing device in which they are included to perform a second level load balancing of session transaction initiation requests which are received at the SIP processing device in which they are included, said second level load balancing including upon receipt of a session transaction initiation request making a retargeting determination based on the session transaction load state information of the SIP processing devices in the cluster and determining whether to retarget or retain said received session transaction initiation request for processing.

The invention is also applicable to embodiments in which a non-transitory computer readable medium includes processor executable instructions that when executed control one or more processors in each of a plurality of SIP processing devices to perform one or more of the aforementioned method steps, e.g., the steps of methods 700, 800 and 900.

A non-transitory computer readable medium including processor executable instructions for use in a plurality of SIP processing devices, the non-transitory computer readable medium comprising: instructions which when executed by at least one processor in each of said plurality of SIP processing devices control each of said SIP processing devices to: (i) dynamically form a load balancing cluster of SIP processing devices from said plurality of SIP processing devices, said cluster of SIP processing devices being self-organized; (ii) dynamically build a communications network for distributing session transaction load state information among the SIP processing devices in the cluster; (iii) independently and asynchronously control the SIP processing device in which the processor is included to generate session transaction load state information on a recurring basis reflecting its current session transaction load state. In some embodiments, the non-transitory computer readable medium further comprises instructions which when executed by a set of individual SIP processing devices of the cluster of SIP processing devices control each of said individual SIP processing devices to: asynchronously share on a recurring basis generated session transaction load state information with one or more SIP processing devices of the cluster.

The techniques of various embodiments may be implemented using software, hardware and/or a combination of software and hardware. Various embodiments are directed to apparatus, e.g., SIP processing devices, session border controllers, SIP application servers, SIP proxy devices, telecommunications systems, network nodes and/or network equipment devices. Various embodiments are also directed to methods, e.g., method of controlling and/or operating, SIP processing devices, session border controllers, SIP application servers, SIP proxy devices, telecommunications equipment, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments nodes and/or elements described herein are implemented using one or more modules to perform the steps corresponding to one or more methods, for example, message reception, signal processing, sending, comparing, determining and/or transmission steps. Thus, in some embodiments various features are implemented using modules or in some embodiments logic such as for example logic circuits. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, including a processor configured to implement one, multiple or all of the steps of one or more methods of the invention.

In some embodiments, the processor or processors, e.g., CPUs, of one or more devices, e.g., SIP processing devices such as session border controllers are configured to perform the steps of the methods described as being performed by the SIP processing device, e.g., session border controllers. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node or SIP processing device such as a session border controller, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

In some embodiments, the steps are implemented with hardware circuitry specifically designed and/or dedicated to perform the step in a highly efficient and computation fast manner at or approaching wire speed.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of load balancing Session Initiation Protocol session transactions among a self-organized cluster of Session Initiation Protocol (SIP) processing devices, the method comprising:
    dynamically forming a load balancing cluster of SIP processing devices from a plurality of SIP processing devices, said cluster of SIP processing devices being self-organized;
    dynamically building a communications network, by said cluster of SIP processing devices, for distributing session transaction load state information among the SIP processing devices in the cluster;
    each of the SIP processing devices of the cluster asynchronously determining session transaction load state information on a recurring basis reflecting its current session transaction load state; and
    performing, by the SIP processing devices of the cluster, a second level load balancing of session transactions.

2. The method of claim 1 further comprising:
    a set of individual SIP processing devices of the cluster of SIP processing devices asynchronously sharing on a recurring basis generated session transaction load state information with one or more SIP processing devices of the cluster.

3. The method of claim 2,
    wherein said performing, by the SIP processing devices of the cluster, a second level load balancing of said session transactions includes using said shared session transaction load state information, said second level load balancing including individual SIP processing devices upon receipt of a session transaction initiation request probabilistically retargeting said session transaction initiation request based on knowledge of the load of peer SIP processing devices of the cluster determined from said shared session transaction load state information.

4. The method of claim 3 wherein said retargeting includes responding to a SIP request with a SIP 3XX redirection message or relaying the SIP request to a selected target SIP processing device, said selected target SIP processing device being another SIP processing device in said cluster of SIP processing devices.

5. The method of claim 3 wherein said retargeting includes responding to a SIP request received at a first SIP processing device from the cluster of SIP processing devices with a SIP response including a contact address for a second SIP processing device from the cluster of SIP processing devices.

6. The method of claim 3 further including determining by a first SIP processing device as part of a second level load balancing determination that a received SIP request should be sent to another SIP processing device in the cluster of SIP processing devices based on the session transaction load state information of the SIP processing devices in the cluster.

7. The method of claim 1 further comprising:
    performing a first level load balancing of said session transactions among said cluster of SIP processing devices prior to performing said second level load balancing of session transactions.

8. The method of claim 7 wherein said first level load balancing is performed without knowledge of the session transaction load state information for the SIP processing devices of the cluster.

9. The method of claim 7, wherein said performing said second level load balancing of said session transactions includes individual SIP processing devices of the cluster upon receipt of a session transaction initiation request making a retargeting determination based on the session transaction load state information of the SIP processing devices in the cluster and determining whether to retarget or retain said received session transaction initiation request for processing.

10. The method of claim 1 wherein the session transaction load state information for a SIP processing device corresponds to at least one of a slack capacity of the SIP processing device or a portion of the SIP processing resources being utilized of the total SIP processing resources available for utilization of the SIP processing device.

11. The method of claim 10 wherein the session transaction load state information for a SIP processing device corresponds to said slack capacity, said slack capacity including at least one of a call capacity or a session registration capacity.

12. The method of claim 10 wherein the slack capacity is determined based on two dimensions, the first dimension being a count-based slack capacity and the second dimension being a rate based slack capacity.

13. A communications system for load balancing Session Initiation Protocol session transactions among a self-organized cluster of Session Initiation Protocol (SIP) processing devices, the system comprising:
    a plurality of self-organizing SIP processing devices configured to dynamically form a load balancing cluster of SIP processing devices;
    a communications network coupling the SIP processing devices of the cluster together for distributing session transaction load state information among the SIP processing devices in the cluster; and wherein each of the SIP processing devices of the cluster includes a processor configured to:

(i) independently and asynchronously control the SIP processing device in which the processor is included to generate session transaction load state information on a recurring basis reflecting its current session transaction load state and (ii) control the SIP processing device of the cluster in which the processor is included to perform a second level load balancing of session transactions.

14. The communications system of claim 13 wherein:

a set of individual SIP processing devices of the cluster of SIP processing devices have their corresponding processor further configured to control the SIP processing device in which the processor is included to share on a recurring basis said generated session transaction load state information with one or more SIP processing devices of the cluster.

15. The system of claim 14 further comprising:

a front end loading balancing device including a processor configured to control the front end load balancing device to perform a first level load balancing of session transactions among said cluster of SIP processing devices.

16. The system of claim 15 wherein the processor of said front end load balancing device is further configured to control said front end load balancing device to perform said first level load balancing without knowledge of the session transaction load state information for the SIP processing devices of the cluster.

17. The system of claim 15, wherein each of the SIP processing devices of the cluster of SIP processing devices includes a receiver for receiving session transaction initiation requests; and wherein said processors included in each of the SIP processing devices of the cluster are further configured to control the SIP processing devices of the cluster in which the processor is included to perform said second level load balancing of said session transactions using said shared session transaction load state information upon receipt of a session transaction initiation request, said second level load balancing including probabilistically retargeting said session transaction initiation request based on knowledge of the load of peer SIP processing devices of the cluster determined from said shared session transaction load state information.

18. The system of claim 17 wherein said retargeting includes responding to a SIP request with a SIP 3XX redirection message or relaying the SIP request to a selected target SIP processing device, said selected target SIP processing device being another SIP processing device in said cluster of SIP processing devices.

19. The system of claim 13 wherein the session transaction load state information for a SIP processing device corresponds to at least one of a slack capacity of the SIP processing device or a portion of the SIP processing resources being utilized of the total SIP processing resources available for utilization of the SIP processing device.

20. The system of claim 19 wherein the slack capacity is determined based on two dimensions, the first dimension being a count-based slack capacity and the second dimension being a rate based slack capacity.

* * * * *